US012387443B2

(12) United States Patent
Pearson et al.

(10) Patent No.: US 12,387,443 B2
(45) Date of Patent: *Aug. 12, 2025

(54) GENERATION AND DISPLAY OF INTERACTIVE 3D REAL ESTATE MODELS

(71) Applicant: CoreLogic Solutions, LLC, Irvine, CA (US)

(72) Inventors: Neil Pearson, Ottawa (CA); Patrick Jacolenne, Perris, CA (US)

(73) Assignee: CoreLogic Solutions, LLC, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/657,586

(22) Filed: May 7, 2024

(65) Prior Publication Data
US 2024/0404215 A1    Dec. 5, 2024

Related U.S. Application Data

(63) Continuation of application No. 16/596,605, filed on Oct. 8, 2019, now Pat. No. 12,014,433.
(Continued)

(51) Int. Cl.
G06T 19/00     (2011.01)
B64C 39/02     (2023.01)
(Continued)

(52) U.S. Cl.
CPC ............ *G06T 19/006* (2013.01); *B64C 39/02* (2013.01); *G06Q 50/16* (2013.01); *G06T 15/005* (2013.01);
(Continued)

(58) Field of Classification Search
None
See application file for complete search history.

(56) References Cited

U.S. PATENT DOCUMENTS 5,721,691 A    2/1998  Wuller et al.
6,215,498 B1   4/2001  Filo et al.
(Continued)

FOREIGN PATENT DOCUMENTS

CN    108665449    10/2018

OTHER PUBLICATIONS

Polat et al., "DEM generation with UAV Photogrammetry and Accuracy analysis in Sahitler Hill". Elsevier. 2015. (Year: 2015).
(Continued)

*Primary Examiner* — Andrew G Yang
(74) *Attorney, Agent, or Firm* — Knobbe Martens Olson & Bear LLP

(57) ABSTRACT

Systems and methods are disclosed for the generation and interactive display of three-dimensional (3D) models that accurately represent buildings and other large, complex objects possessing both internal and external features. More specifically, an exterior mesh can be generated that captures all the external features of the building. An interior mesh can also be generated that captures all the internal features of the building. The exterior mesh and the interior mesh may be layered and combined using geographical coordinates (e.g., global positioning system (GPS) data) in order to create a combined mesh that can be used to render a 3D model of the object. Any images taken of external or internal features may also be appended to the 3D model or even overlaid on the 3D model (like textures), based on the location and directional view associated with those images.

20 Claims, 19 Drawing Sheets

Related U.S. Application Data

(60) Provisional application No. 62/743,450, filed on Oct. 9, 2018.

(51) Int. Cl.
  *G06Q 50/16* (2024.01)
  *G06T 15/00* (2011.01)
  *G06T 17/20* (2006.01)
  *G06T 19/20* (2011.01)

(52) U.S. Cl.
  CPC ............ *G06T 17/205* (2013.01); *G06T 19/20* (2013.01); *G06T 2210/04* (2013.01); *G06T 2219/2016* (2013.01)

(56) References Cited

U.S. PATENT DOCUMENTS

| | | |
|---|---|---|
| 8,818,768 B1 | 8/2014 | Fan et al. |
| 9,530,250 B2 | 12/2016 | Mazula |
| 9,547,883 B1 | 1/2017 | Stepanenko |
| 10,142,496 B1 | 11/2018 | Rao et al. |
| 10,579,749 B1 | 3/2020 | Davis et al. |
| 11,069,145 B1 | 7/2021 | Pearson et al. |
| 11,257,132 B1 | 2/2022 | Cornelison et al. |
| 2009/0237396 A1 | 9/2009 | Venezia et al. |
| 2010/0318929 A1 | 12/2010 | Hilton et al. |
| 2012/0166146 A1 | 6/2012 | Cincotti |
| 2013/0271462 A1 | 10/2013 | Frank |
| 2014/0043436 A1 | 2/2014 | Bell et al. |
| 2014/0125667 A1 | 5/2014 | Praun et al. |
| 2015/0170327 A1 | 6/2015 | Feldman et al. |
| 2016/0078506 A1* | 3/2016 | Sesti ................... G06F 3/04815 705/27.2 |
| 2016/0343140 A1 | 11/2016 | Ciprari et al. |
| 2017/0103584 A1 | 4/2017 | Vats |
| 2017/0235018 A1 | 8/2017 | Foster et al. |
| 2018/0041907 A1 | 2/2018 | Terry et al. |
| 2018/0075649 A1 | 3/2018 | Godwin et al. |
| 2018/0247447 A1* | 8/2018 | Serna ..................... G06T 15/40 |
| 2018/0350044 A1* | 12/2018 | Ponto ..................... G06T 15/00 |
| 2018/0365496 A1 | 12/2018 | Hovden et al. |
| 2018/0374276 A1 | 12/2018 | Powers et al. |
| 2019/0005719 A1 | 1/2019 | Fleischman et al. |
| 2019/0164340 A1 | 5/2019 | Pejic et al. |
| 2020/0004900 A1* | 1/2020 | Struzyna ................ G06F 30/13 |
| 2020/0020159 A1 | 1/2020 | Yang |
| 2021/0072737 A1 | 3/2021 | Li et al. |
| 2022/0076490 A1 | 3/2022 | Pearson et al. |

OTHER PUBLICATIONS

Reality State Interactive, "Interactive Real Estate ipad Augmented Reality", retrieved online: https://www.youtube.com/watch?v=ZqV6sNDiU6A (2017).

* cited by examiner

GENERATION AND DISPLAY OF INTERACTIVE 3D REAL ESTATE MODELS

CROSS-REFERENCE TO RELATED APPLICATIONS

This application is a continuation of U.S. patent application Ser. No. 16/596,605, entitled "GENERATION AND DISPLAY OF INTERACTIVE 3D REAL ESTATE MODELS" and filed on Oct. 8, 2019, which claims priority under 35 U.S.C. § 119 (e) to U.S. Provisional Application No. 62/743,450, entitled "INTERACTIVE DATA VISUALIZATION CENTER" and filed on Oct. 9, 2018, which is hereby incorporated by reference herein in its entirety.

FIELD OF THE DISCLOSURE

The described technology generally relates to computer-generated models and, more specifically, to the generation and interactive display of three-dimensional (3D) models that accurately reproduce internal and external features.

BACKGROUND

Modelers often utilize computer software to create 3D models of objects that can be displayed. In order to create a 3D model that serves as an accurate representation of an object, the modeler may require as much data as possible regarding the various dimensions of that object. If the object exists, then the modeler may also be able to reference images of the object or the object itself if it is available. This process of handcrafting a 3D model for an object can involve a large amount of work that may not be transferrable between different objects, requiring 3D models for distinct objects to be created completely separately.

SUMMARY OF THE DISCLOSURE

Described herein are systems and methods for the generation and interactive display of 3D models that accurately represent buildings and other large, complex objects possessing both internal and external features. More specifically, an exterior mesh can be generated that captures all the external features of the building. An interior mesh can also be generated that captures all the internal features of the building.

The exterior mesh and the interior mesh may be layered and combined using geographical coordinates (e.g., GPS data) in order to create a combined mesh that can be used to render a 3D model of the object. Any images taken of external or internal features may also be appended to the 3D model or even overlaid on the 3D model (like textures), based on the location and directional view associated with those images. The 3D model can then be displayed in various virtualized, interactive, 360 degree views, such as through a display setup that enables users (e.g., appraisers or buyers) to closely analyze the building (e.g., through the 3D model) from a remote location.

As will be described, both the interior mesh and the exterior mesh may be generated in a variety of ways. For instance, the interior mesh and the exterior mesh can be generated through the use of 3D scanning/mapping software and hardware. During the scanning/mapping process, the 3D scanning/mapping software and hardware may be configured to also collect images of the external and internal features of the object, as well as positioning data such as geographical coordinates. The combined mesh and the 3D model may be automatically generated by one or more computers using the positioning data.

In this way, the systems and methods described herein allow 3D models for large, complex objects possessing both internal and external features to be quickly and efficiently generated. In prior systems, the modeler may have to individually create a separate 3D model by hand for each of these large, complex objects possessing both internal and external features. This can be a painstaking, error-prone process. In contrast to prior systems, the procedurally-defined, computer-based approach described herein shifts the focus of the modeler towards providing human oversight of the overall process and the capture of data used to generate the interior and exterior meshes, such as by configuring and operating the 3D scanning/mapping software and hardware, as well as fixing any mistakes in the model. This enables modelers to create 3D models of these large, complex objects possessing both internal and external features with realistic accuracy while providing flexibility, speed, and efficiency which has not been possible. The systems and methods described herein therefore improve the functioning of the computer and address technological problems.

Various aspects of the novel systems and methods are described more fully hereinafter with reference to the accompanying drawings. Aspects of this disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the novel systems, apparatuses, and methods disclosed herein, whether implemented independently of or combined with any other aspect. For example, an apparatus may be implemented or a method may be practiced using any number of the aspects set forth herein. In addition, the scope is intended to encompass such an apparatus or method which is practiced using other structure, functionality, or structure and functionality in addition to or other than the various aspects set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to any systems and/or devices that could benefit from universal facial expression. The detailed description and drawings are merely illustrative of the disclosure rather than limiting, the scope of the disclosure being defined by the appended claims and equivalents thereof.

In various embodiments, a computer-implemented method is disclosed that is implemented by a model generation and display system having one or more hardware processors. The computer-implemented method may include steps for: generating an exterior mesh based on an exterior of a building, wherein the exterior mesh is associated with exterior mesh positioning data; generating an interior mesh based on an interior of the building, wherein the interior mesh is associated with interior mesh positioning data; orienting the exterior mesh relative to the interior mesh by referencing the exterior mesh positioning data and the interior mesh positioning data; generating a combined mesh from the oriented exterior mesh and the interior mesh; and rendering a three-dimensional (3D) model of the building from the combined mesh.

In some embodiments, the computer-implemented method may further include: determining parts of the 3D model; and appending images to the 3D model. In some embodiments, the appended images include captured images of the exterior of the building and captured images of the interior of the building. In some embodiments, the view of the 3D model is a top-down view overlaid with a captured image of a roof of the building. In some embodiments, the view of the 3D model shows an interior structure of the building and one or more images of the interior. In some embodiments, the computer-implemented method may further include: generating display data for a view of the 3D model of the building; and providing the display data for the view to a display setup, wherein the display setup includes a multifaction monitor array and a touchscreen table.

In some embodiments, generating the exterior mesh of the building may include steps for: directing an aerial vehicle to fly around the building; obtaining dimension data for the exterior of the building using the aerial vehicle; obtaining exterior mesh positioning data using the aerial vehicle; and capturing images of the exterior of the building using the aerial vehicle. In some embodiments, generating the interior mesh of the building may include steps for: obtaining dimension data for the interior of the building through a mobile device; obtaining interior mesh positioning data using the mobile device; and capturing images of the interior of the building using the mobile device.

In some embodiments, the images of the interior of the building are 360 degree images. In some embodiments, the exterior mesh positioning data may include global positioning system (GPS) coordinates. In some embodiments, the interior mesh positioning data may include global positioning system (GPS) coordinates.

In various embodiments, non-transitory computer storage media is disclosed that stores instructions that when executed by a system of one or more computers, causes the one or more computers to perform operations that include: generating an exterior mesh based on an exterior of a building, wherein the exterior mesh is associated with exterior mesh positioning data; generating an interior mesh based on an interior of the building, wherein the interior mesh is associated with interior mesh positioning data; orienting the exterior mesh relative to the interior mesh by referencing the exterior mesh positioning data and the interior mesh positioning data; generating a combined mesh from the oriented exterior mesh and the interior mesh; and rendering a three-dimensional (3D) model of the building from the combined mesh.

In some embodiments, the instructions stored on the non-transitory computer storage media, when executed by the system of one or more computers, further cause the one or more computers to perform operations that include: determining parts of the 3D model; and appending images to the 3D model. In some embodiments, the instructions stored on the non-transitory computer storage media, when executed by the system of one or more computers, further cause the one or more computers to perform operations that include: generating display data for a view of the 3D model of the building; and providing the display data to for the view to a display setup, wherein the display setup includes a multifaction monitor array and a touchscreen table. In some embodiments, the instructions stored on the non-transitory computer storage media, when executed by the system of one or more computers, further cause the one or more computers to perform operations that include: directing an aerial vehicle to fly around the building; obtaining dimension data for the exterior of the building using the aerial vehicle; obtaining exterior mesh positioning data using the aerial vehicle; and capturing images of the exterior of the building using the aerial vehicle. In some embodiments, the instructions stored on the non-transitory computer storage media, when executed by the system of one or more computers, further cause the one or more computers to perform operations that include: obtaining dimension data for the interior of the building through a mobile device; obtaining interior mesh positioning data using the mobile device; and capturing images of the interior of the building using the mobile device.

In various embodiments, a model generation and display system is disclosed that includes computer storage media storing instructions and one or more hardware processors configured to execute the instructions. The instructions, when executed, cause the one or more hardware processors to perform operations that include: generating an exterior mesh based on an exterior of a building, wherein the exterior mesh is associated with exterior mesh positioning data; generating an interior mesh based on an interior of the building, wherein the interior mesh is associated with interior mesh positioning data; orienting the exterior mesh relative to the interior mesh by referencing the exterior mesh positioning data and the interior mesh positioning data; generating a combined mesh from the oriented exterior mesh and the interior mesh; and rendering a three-dimensional (3D) model of the building from the combined mesh.

In some embodiments, the instructions, when executed, cause the one or more hardware processors to further perform operations that include: determining parts of the 3D model; and appending images to the 3D model. In some embodiments, the instructions, when executed, cause the one or more hardware processors to further perform operations that include: generating display data for a view of the 3D model of the building; and providing the display data to for the view to a display setup, wherein the display setup includes a multifaction monitor array and a touchscreen table. In some embodiments, the instructions, when executed, cause the one or more hardware processors to further perform operations that include: directing an aerial vehicle to fly around the building; obtaining dimension data for the exterior of the building using the aerial vehicle; obtaining exterior mesh positioning data using the aerial vehicle; and capturing images of the exterior of the building using the aerial vehicle.

BRIEF DESCRIPTION OF THE DRAWINGS

The following drawings and the associated description herein are provided to illustrate specific embodiments of the disclosure and are not intended to be limiting.

DETAILED DESCRIPTION

Figure 1:
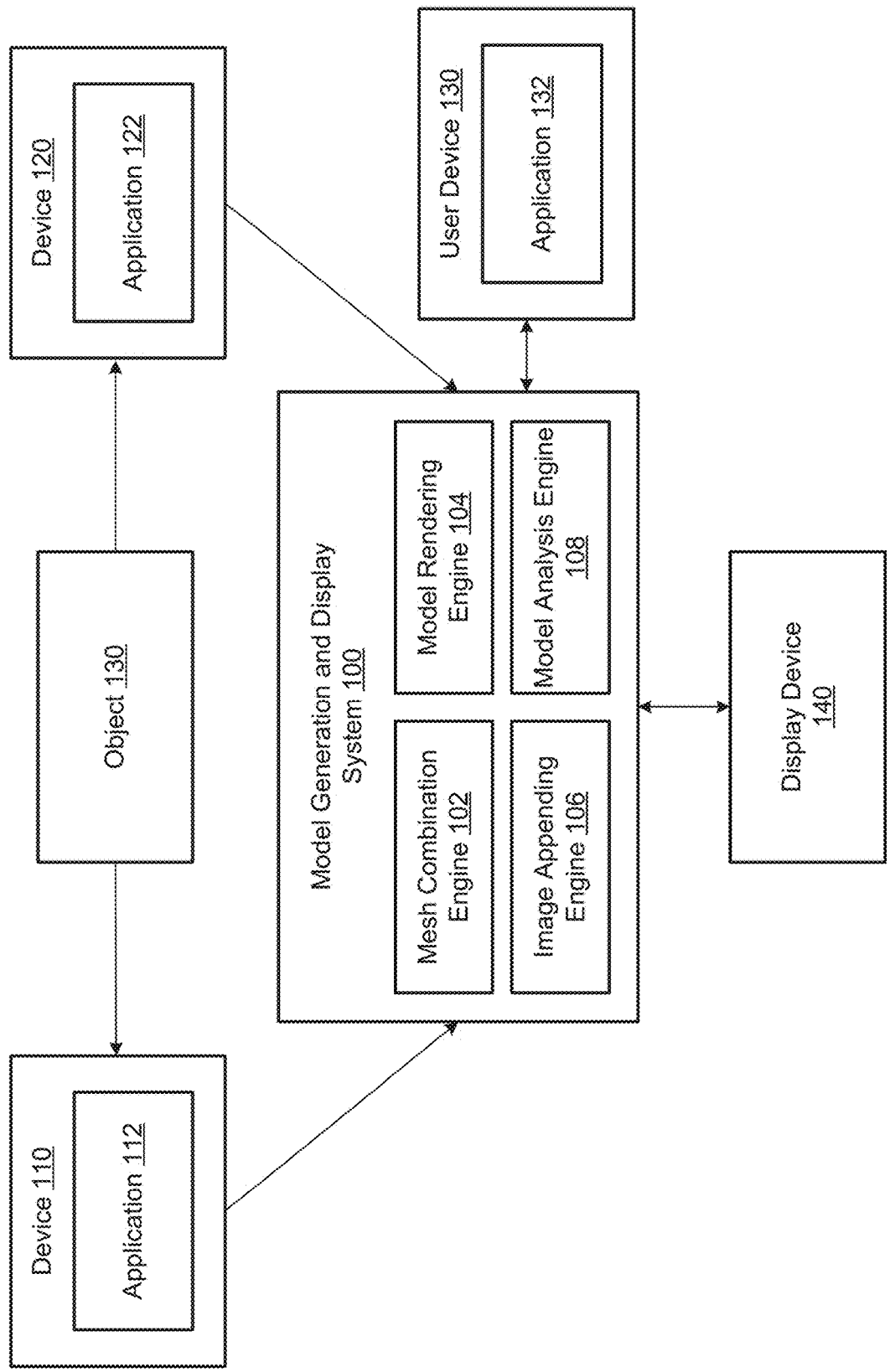
FIG. 1 illustrates a block diagram of an example model generation and display system, in accordance with embodiments of the present disclosure.

It can be especially time-consuming and resource intensive for modelers to handcraft 3D models for large, complex objects that have both internal and external features without impacting fidelity. A good example of this is the modelling of real estate properties (e.g., buildings). Buildings typically have numerous external (e.g., the building exterior, windows, doors, sidings, and so forth) and internal features (e.g., rooms, hallways, doors, fixtures, appliances, flooring, and so forth) that have to be reproduced, and some of those features can be rather detailed. The dimensions associated with all of those features have to be accurately measured and captured, which can take considerable time if those dimensions have to be measured on-site (e.g., if a blueprint is not available). Buildings can also be relatively large in size and complex. For instance, a building can have multiple rooms that cannot be encapsulated within a single photograph, thereby requiring that multiple photographs be taken from different angles to serve as a reference. Buildings can also vary greatly in design and are often unique, which means that any modelling work is generally not transferable (e.g., if an entire neighborhood has to be modelled).

Accordingly, there exists a need for a way to streamline the process of generating and interactively displaying 3D models that accurately represent buildings and other large, complex objects possessing both internal and external features. This would greatly reduce the time and cost associated with creating these models. Embodiments of the present disclosure address these issues and more.

This specification describes computer-based systems and methods for the generation and interactive display of 3D models that accurately represent large, complex objects possessing both internal and external features.

As will be described, the external features and their associated position data (e.g., geographical coordinates) of an object can be captured (e.g., via sensors, cameras, light detection and ranging (LiDAR), and so forth) and used to generate an exterior mesh. The internal features and their associated position data (e.g., geographical coordinates) of the object can be captured (e.g., via sensors, cameras, LiDAR, and so forth) and used to generate an interior mesh. The exterior mesh and the interior mesh may be layered and combined by referencing the position data in order to create a combined mesh that can be used to render a 3D model of the object. Any images of external or internal features may also be appended to the 3D model or even overlaid on the 3D model (like textures), based on the location and directional view associated with those images. The 3D model can then be displayed in various virtualized, interactive, 360 degree views, such as through a display setup that enables users (e.g., appraisers or buyers) to closely analyze the object (e.g., properties) from a remote location.

In order to facilitate an understanding of the systems and methods discussed herein, a number of terms are described below. The terms described below, as well as other terms used herein, should be construed broadly to include the provided definitions, the ordinary and customary meaning of the terms, and/or any other implied meaning for the respective terms.

As used herein, an exterior mesh may refer to a wireframe mesh, or point-cloud, model of an exterior surface and the external features of an object (e.g., a building, furniture, an appliance, or any other physical structure). The point-cloud may include points with location and depth information connected via vertices.

As user herein, an interior mesh may refer to a wireframe mesh, or point-cloud, model of an interior surface and the internal features of an object (e.g., a building). The point-cloud may include points with location and depth information connected via vertices.

As user herein, a three-dimensional (3D) model can refer to a collection of points in 3D space, connected by various geometric entities or shapes such as triangles, lines, curved surfaces, etc., to represent an object (e.g., a building). The 3D model can be created manually using a computing device, algorithmically (procedural modeling), or by scanning blueprints, floor plans, or other similar documents. The surfaces of the 3D model may be further defined with texture mapping. In some embodiments, a 3D model can be a wireframe mesh, or point-cloud, model of an object (e.g., a building, furniture, an appliance, or any other physical structure), with textures (e.g., blended textures) on the model or images (or video) appended to the model. A 3D model may define both the exterior and the interior of the object. A 3D model can be divided into a plurality of sections or portions that are associated with the various parts or features in the object associated with the model (e.g., structures, rooms, adornments, and so forth).

As used herein in reference to user interactions with data displayed by a computing system, "user input" is a broad term that refers to any type of input provided by a user that is intended to be received and/or stored by the system, to cause an update to data that is displayed by the system, and/or to cause an update to the way that data is displayed by the system. Non-limiting examples of such user input include keyboard inputs, mouse inputs, digital pen inputs, voice inputs, finger touch inputs (e.g., via touch sensitive display), gesture inputs (e.g., hand movements, finger movements, arm movements, movements of any other appendage, and/or body movements), and/or the like. Additionally, user inputs to the system may include inputs via tools and/or other objects manipulated by the user. For example, the user may move an object, such as a tool, stylus, or wand, to provide inputs. Further, user inputs may include motion, position, rotation, angle, alignment, orientation, configuration (e.g., fist, hand flat, one finger extended, etc.), and/or the like. For example, user inputs may comprise a position, orientation, and/or motion of a hand and/or a 3D mouse.

As used herein, a data store can refer to any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

As used herein, a database can refer to any data structure (and/or combinations of multiple data structures) for storing and/or organizing data, including, but not limited to, relational databases (e.g., Oracle databases, mySQL databases, and so on), non-relational databases (e.g., NoSQL databases, and so on), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Example Model Generation and Display System

With regards to the figures, FIG. 1 illustrates a block diagram of an example model generation and display system 100 that can be used to generate and interactively display a 3D model based on an object 130. The model generation and display system 100 can be a system of one or more computers, one or more virtual machines executing on a system of one or more computers, and so on. The functionality of the model generation and display system 100 can also be distributed across multiple systems, even systems associated with different entities. For instance, the generation of a combined mesh, the rendering of a 3D model based on the combined mesh, and the appending of images to the 3D model (e.g., performed by the mesh combination engine 102, model rendering engine 104, image appending engine 106) can be performed by a first system of one or more computers (e.g., a cloud computing cluster), while the display of the 3D model (e.g., performed by the display engine 108) can be performed by a second system.

A device 110 running an application 112 may be configured to perform 3D scanning and mapping of the exterior of the object 130 and its associated external features. The device 110 may be further configured to take images of the exterior of the object 130, and thus, the device 110 may include one or more camera(s) (not shown, such as a digital camera, a thermal imaging camera, and so forth) for taking images or video of the object 130. The use of multiple cameras may enable the capture of a same portion of the object 130, but taken at different angles (e.g., stereo cameras) and/or to capture different information (e.g., visible light, infrared light, etc.). In this way, depth information can be obtained. For example, one or more cameras may be used to capture images of the exterior of the object 130 from different angles. Optionally, depth sensors (e.g., e.g., LiDAR, infrared points being projected, stereo cameras, and so on) may be utilized to obtain accurate depth information of the exterior. The device 110 may be able to use photogrammetry on the captured images (e.g., to obtain measurements from the photographs) and the accompanying depth information to generate an exterior mesh of the object (e.g., a point cloud of the object, such as points connected via vertices). The device 110 may also be able to collect positioning data (e.g., through a global positioning system (GPS) chip or sensor) while collecting images or other data associated with the exterior of the object 130. Various images may be captured and utilized to generate a more complete exterior mesh of the object 130. In some embodiments, the device 110 may be a drone or other manned or unmanned aerial vehicle that can be configured to fly around the object 130 (e.g., a building) in order to capture data for the exterior of the object 130 (e.g., dimensions) and images of the exterior.

The application 112 may be configured to take the images and depth information and generate an exterior mesh. For example, the application 112 may combine (e.g., stitch together) images of the object 130 and generate a point cloud of the object 130. For example, the point cloud can include multitudes of points defining depth associated with the object 130 at a respective location. This point cloud can therefore represent an accurate model of the exterior of object 130. The application 112 may also be able to take the collected positioning data from the device 110 and associate it with the exterior mesh (e.g., associate parts of the exterior mesh with GPS coordinates) for geo-referencing purposes when generating the combined mesh. The application 112 can output the exterior mesh (e.g., point cloud) and send it to the model generation and display system 100.

A device 120 running an application 122 may be configured to scan and map the interior of the object 130 (e.g., building) and its associated internal features. The device 120 may be further configured to take images of the interior of the object 130, and thus, the device 120 may include one or more camera(s) (not shown, such as a digital camera, a thermal imaging camera, and so forth) for taking images or video of the object 130. The cameras may be 360 degree cameras capable of taking 360 degree images, or the application 122 may stitch together 360 degree images from multiple images. The use of multiple cameras may enable the capture of a same portion of the object 130, but taken at different angles (e.g., stereo cameras) and/or to capture different information (e.g., visible light, infrared light, etc.). In this way, depth information can be obtained. For example, one or more cameras may be used to capture images of the interior of the object 130 from different angles. Optionally, depth sensors (e.g., e.g., LiDAR, infrared points being projected, stereo cameras, and so on) may be utilized to obtain accurate depth information of the interior. The device may be able to use photogrammetry on the captured images (e.g., to obtain measurements from the photographs) and the accompanying depth information to generate a mesh of the object (e.g., a point cloud of the object, such as points connected via vertices). The device 120 may also be able to collect positioning data (e.g., through a GPS chip or sensor) while collecting images or other data associated with the interior of the object 130. In some embodiments, the device 120 may be a mobile device or computer (e.g., a tablet) that can be used with additional sensors (e.g., an Occipital structure sensor) in order to capture data for the interior of the object 130 (e.g., dimensions, doors, windows, fixtures, appliances, flooring, and so forth) and images of the interior.

The application 122 may be configured to take the images and depth information and generate an interior mesh. For example, the application 122 may combine (e.g., stitch together) images of the object 130 and generate a point cloud of the object 130. For example, the point cloud can include multitudes of points defining depth associated with the object 130 at a respective location. This point cloud can therefore represent an accurate model of the interior of object 130. The application 122 may also be able to take the collected positioning data from the device 120 and associate it with the interior mesh (e.g., associate parts of the interior mesh with GPS coordinates) for geo-referencing purposes when generating the combined mesh. The application 122 can output the interior mesh (e.g., point cloud) and send it to the model generation and display system 100.

The model generation and display system 100 may have various components, such as a mesh combination engine 102, a model rendering engine 104, an image appending engine 106, and a model analysis engine 108. The mesh combination engine 102 may be configured to take the interior mesh and the exterior mesh and combine them into a combined mesh. In order to do this, the mesh combination engine 102 may use geo-referencing in order to align the exterior mesh on the interior mesh (e.g., using the GPS coordinates associated with the exterior mesh and the interior mesh). By orienting the exterior mesh and the interior mesh based on matching or similar GPS coordinates, the exterior mesh can be overlaid onto the interior mesh so that the portions of the exterior mesh properly correspond to the portions of the interior mesh. The interior mesh and the exterior mesh can be combined, or they may be converted to point clouds and aggregated, with the resulting combined point cloud used to generate a combined mesh.

The model rendering engine 104 may be configured to render the combined mesh into a 3D model, and the image appending engine 106 may be configured to append images (e.g., captured images of the exterior or interior) to different locations on the 3D model. Appending an image (or video) to a portion of the 3D model can include creating metadata that associates an image (or video) with a location within the 3D model (where the metadata is stored or otherwise associated with the 3D model 124), modifying a portion of the 3D model to point to an image (or video) identifier or a storage location of an image (or video), modifying a portion of the 3D model to store the image (or video) such that the image (or video) is displayed with the portion of the 3D model 124 is accessed, and/or the like. For instance, an image captured of the interior may have been taken at a particular location inside the object 130 (e.g., building) and the image may have metadata indicating GPS coordinates at which the image was taken. The GPS coordinates associated with the interior/exterior meshes can be used to determine a corresponding position in the 3D model that virtually corresponds to the location the image was taken and the image can be appended to that position. Thus, a user may be able to select that position in the 3D model to bring up a view of the appended image, in order to virtually "see" inside the building from the perspective of the location the image was taken. In other words, where images were taken outside/inside of the building can be virtualized and tied to a particular location and directional view of the 3D model when the images are displayed. If an image (e.g., a 360 degree image of a room) is tied to a particular room, the positioning of the location the image was taken can be tied to the corresponding position in the 3D model, so that the perspective of the image can change naturally as the 3D model is rotated.

The model analysis engine 108 may be configured to determine the different parts of the generated 3D model and either split or classify the generated 3D model into the different parts. In some embodiments, the model analysis engine 108 may utilize a machine learning or other artificial intelligence algorithm that can be trained (e.g., by the model analysis engine 108) to determine different parts of the 3D model (e.g., this is the bedroom, this is the basement, and so forth). The machine learning algorithm may have been trained on images of the parts of various buildings (e.g., homes) in order to learn the different features that are typically associated with different kinds of rooms. For instance, the machine learning algorithm may learn to recognize the features associated with a bedroom, the features associated with a kitchen, and so forth. Thus, the machine learning algorithm may be able to scan the 3D model and any images (e.g., taken by the camera) associated with each part of the 3D model and then identify those parts of the 3D model based on the images in the training data. As a specific example, an image may be taken of a room in the interior of the building. The machine learning algorithm may determine that there is a toilet in the image, which likely indicates that the image is of a bathroom. The machine learning algorithm can then use the metadata associated with the image (e.g., the GPS coordinates) to determine the corresponding position in the 3D model where that image was taken and classify that entire room of the 3D model as a bathroom.

As illustrated, the model generation and display system 100 is in communication with a user device 130 of a user (e.g., a modeler). The user device 130 can be a desktop computer system, a laptop, a tablet, a mobile device, a wearable computer, and so on. The user device 130 may run application 132, which may be configured to interface with the model generation and display system 100 in order to oversee, control, or direct the generation and/or display of the model of object 130. For instance, through the application 132 on user device 130, the user may be able to select the appropriate interior mesh and exterior mesh to be combined, ensure that the meshes are properly oriented and aligned (if needed), correct for any obvious mistakes in dimension measurements, review and ensure that captured images are appended to the appropriate locations of the model, and so forth. In some embodiments, the model generation and display system 100 may be accessible via a network application (e.g., a web application) through the user device 130. That is, the user device 130 can present a network page (e.g., a web page) or a user interface associated with an application 132 executing on the user device 130 (e.g., an 'app' obtained from an electronic application store, a web application, and so on), and through that network page the user may be able to oversee, control, or direct the generation and/or display of the model of object 130 as previously discussed.

The model generation and display system 100 may also be connected (e.g., a wireless or wired connection) to a display device 140. The display device 140 may be configured to present views of the model of the object 130, which a user may be able to manipulate and interact with. For instance, in some embodiments, the display device 140 may consist of the display setup shown in FIGS. 4A and 4B. Views of the 3D model may be presented on a multifaction monitor array and interacted with using a touchscreen display or a display that recognizes gestures, symbols, and/or hand movements, which in some cases, may take up an entire table. By providing user input to the touchscreen display or display that recognizes different movements or symbols, the user may be able to change the view of the 3D model (e.g., view the exterior/interior, change the angle/perspective shown, view a specific room in the building, and so forth), omit certain parts of the structure (e.g., remove the roof), and so forth. In this manner, manipulations of the 3D model can be tied to the display on the multifaction monitor array in terms of actual images taken of the property. For example, manipulations of the 3D model can cause corresponding manipulations of actual property images displayed on the multifaction monitor array. The view of the 3D model may be interacted with in order to display information with more precise granularity and definition (e.g., missing bricks and chimneys on the roof, etc.).

Examples of Capturing Data for Mesh Generation

Figure 2A:
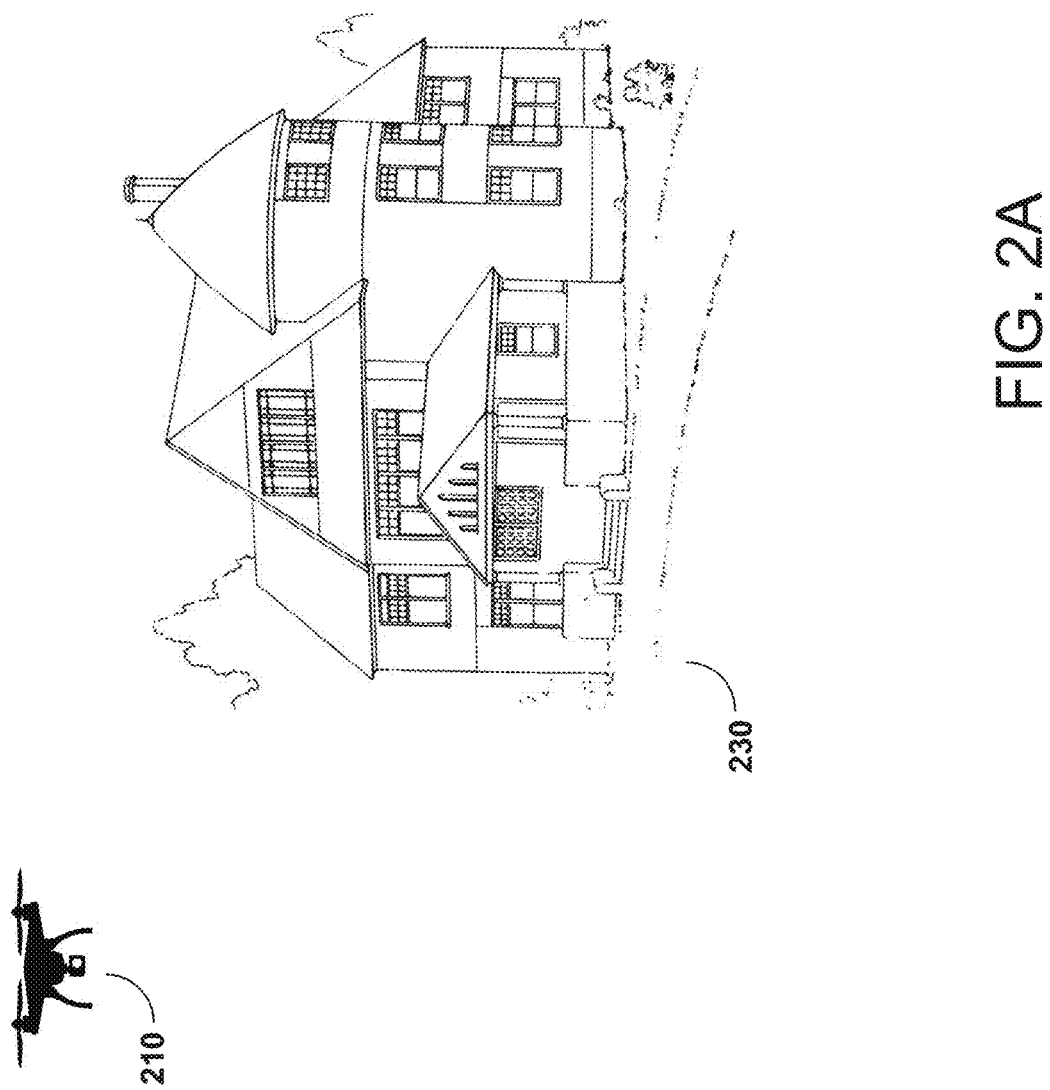
FIG. 2A illustrates an example of how data for the exterior mesh can be captured for an object, in accordance with embodiments of the present disclosure.

FIG. 2A illustrates an example of how data for the exterior mesh can be captured for an object, in accordance with embodiments of the present disclosure. More specifically, a drone 210 (e.g., a mapping probe drone) or other manned or unmanned aerial vehicle can be used to obtain drone-captured images and data associated with the exterior of a building 230 (e.g., the object). The drone 210, software associated with the drone 210, or a model generation and display system (e.g., the model generation and display system 100 in FIG. 1) may be able to generate an external mesh using the drone-captured images and data. It should be noted that this is just one example of how data for the exterior mesh can be captured for an object and other methods may be suitable. In some cases, there may already be existing images that were taken of the object, which can be imported and used by the model generation and display system (e.g., the model generation and display system 100 in FIG. 1) to generate the exterior mesh.

The drone 210 may take drone-captured images of various portions of the exterior of the building 230, such as images of the roof of the building 230, each wall of the building 230, and so forth. The drone 210 may also take drone-captured images of the various portions of the exterior of the building 230 from different angles. The flight path and flight parameters of the drone 210 may be configured in order to produce an accurate exterior mesh based on the building 230, but may further be configured based on additional factors, such as the surrounding environment, the weather conditions during the capture process, and so forth. There may be optimizations that can be performed on the altitude and path for the flight.

Drone-captured images obtained from various different drone-capturing techniques may be used in combination in order to generate an accurate exterior mesh. For instance, in order to capture images of the roof of the building 230, the drone 210 may follow a first approach and fly high over the building 230 to capture nadir imagery (e.g., taken downwind and before the images are autocorrected). In order to capture images of the sides of the building 230, the drone 210 may follow a second approach and fly obliques at a lower altitude, along the sides of the building 230, and capture aerial oblique imagery. The drone 230 may fly a 360 degree panorama around the building 230 on all sides. The capture of as many as 250 images or more may be typical during this process. In order to further improve the accuracy of the exterior mesh, the drone 210 may follow a third approach and fly around the perimeter of the building 230 at a very low altitude (e.g., eye level) in order to capture images of all the sides of the building 230. These images may provide a good pictorial reference that assists in the creation of the exterior mesh and its accuracy, in order to avoid any fadeout on the sides of the exterior mesh that can occur.

The drone 210, software associated with the drone 210, and/or a model generation and display system (e.g., the model generation and display system 100 in FIG. 1) may be able to generate an exterior mesh of the building 230 using the drone-captured images and data. For instance, the drone-captured images for the building 230 may be sent to the model generation and display system. In some embodiments, the model generation and display system may be part of a cloud computing service. Each of the images may have metadata associated with the camera or metadata associated with the GPS unit of the drone 210 that provides position data associated with the image, such that the exact point in space (e.g., down to the centimeter) where the image was taken can be determined. The model generation and display system may be able to perform calculations to determine that exact location based on the GPS information in the metadata. The model generation and display system may then be able to use that information for geo-referencing in order to generate an exterior mesh using known photogrammetry techniques. For instance, the model generation and display system may be able to determine dimensions associated with an exterior wall of the building 230 by calculating the distance between the location the image was captured to the exterior wall using the GPS information (e.g., coordinates).

Figure 2B:
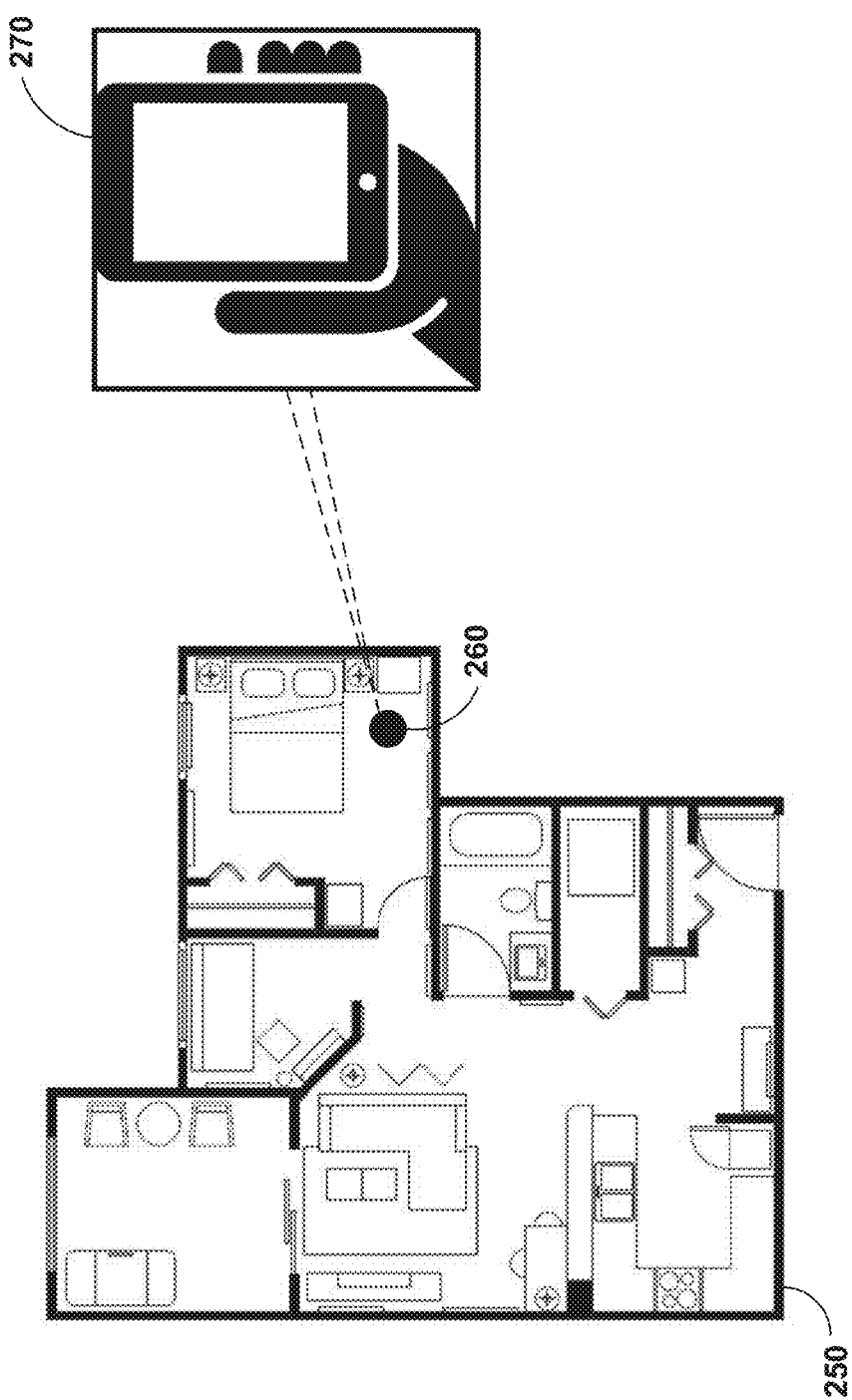
FIG. 2B illustrates an example of how data for the interior mesh can be captured for an object, in accordance with embodiments of the present disclosure.

FIG. 2B illustrates an example of how data for the interior mesh can be captured for an object, in accordance with embodiments of the present disclosure. More specifically, a user 260 can use a device 270 to obtain depth information and capture images by walking around the interior 250 of a building. The device 270, software associated with the device 270, and/or a model generation and display system (e.g., the model generation and display system 100 in FIG. 1) may be able to generate an interior mesh using the depth information and captured images. It should be noted that this is just one example of how data for the interior mesh can be captured for an object and other methods may be suitable. In some cases, there may already be existing images that were taken of the object, which can be imported and used by the model generation and display system (e.g., the model generation and display system 100 in FIG. 1) to generate the interior mesh.

The device 270 and its associated software may be hardware and software that is specifically designed for 3D scanning and mapping. In some embodiments, the device 270 may have internal sensors and cameras needed to perform 3D scanning and mapping, such as depth-viewers or depth sensors and a camera. The user 260 may be able to walk around the interior 250 of the building with the device 270, such as by taking the device 270 into each room of the building and waving it around. By doing so, the device 270 may capture data for an interior mesh using the depth-viewers or depth sensors, which will "dimensionalize" the rooms in the interior 250 of the building by creating three-dimensional measurements of all the interior rooms. These sensors may be able to measure the distance to a wall that the device 270 is pointed at by measuring the depth, and even irregularly-shaped rooms can be dimensionalized through the use of waypoints. During this process, the device 270 may also capture high fidelity, high accuracy images of the interior 250 and its different internal features (as well as the exterior, if needed). In some embodiments, these images may be taken by the camera. The images may be 360 degree panoramic images, but these images may not be needed to build and validate the interior mesh or the final 3D model. Instead, these images may be used to display a virtualized view of the interior when the 3D model is displayed.

The device 270 may also include a sensor capable of collecting positioning data (e.g., GPS coordinates), such as a GPS sensor. The device 270 may acquire positioning data while dimensionalizing and capturing the rooms in the interior 250 of the building, such that positioning data may be associated with particular rooms and/or features in those rooms. For instance, a building may have two rooms: an eastern room and a western room, and the device 270 may be able to determine GPS coordinates associated with both of those rooms. The generated interior mesh may be linked to the positioning data (e.g., GPS coordinates) to enable the interior mesh to be combined with the exterior mesh. For instance, in the previous example, the generated interior mesh may have GPS coordinates for the eastern room and the western room. These GPS coordinates may be used for geo-referencing purposes, and they can be matched to positioning data or GPS coordinates associated with the exterior mesh in order to properly orient the interior mesh and the exterior mesh to create a combined mesh. In some embodiments, the positioning data associated with the geo-referencing may be determined by triangulating the user 260 as the user 260 moves around the interior 250 of the building.

The device 270 may also have features that enable the determination of the floor of the building (e.g., for multi-story buildings) that data is being collected from. These features may include a sensor capable of collecting elevation or altitude data, or software features that allow receiving a user input or user notes indicating the floor that user 260 is on when the device 270 is collecting data (e.g., the second floor). This information may further be used to properly orient the interior mesh and the exterior mesh to create a combined mesh.

In some embodiments, the device 270 may be a portable computer (e.g., a phone, tablet, or laptop) such as an Apple™ iPad, which may be used with an Occipital™ structure sensor and accompanying software. The device 270 may include a 120 degree camera and depth-viewer/depth sensor. The software may instruct the user 260 how to move around the interior 250 with the device 270 and where to point the device 270, in order to collect the three-dimensional measurements of all the interior rooms. The software may instruct the user 260 where to point the device 270, which surfaces or features need to be captured, whether the user 260 is moving too fast or too slow, and so forth. In particular, the software may instruct the user 260 to capture data on the corners of rooms, capture a ceiling if it has an angle, capture data on internal features such as doors and windows, and so forth. In some embodiments, the software may be able to fill in the details associated with particular features of a room (e.g., ceilings, floors) based on captured data associated with other features of the room (e.g., doors, windows, corners) of the room.

Example of 3D Model Creation

Figure 3:
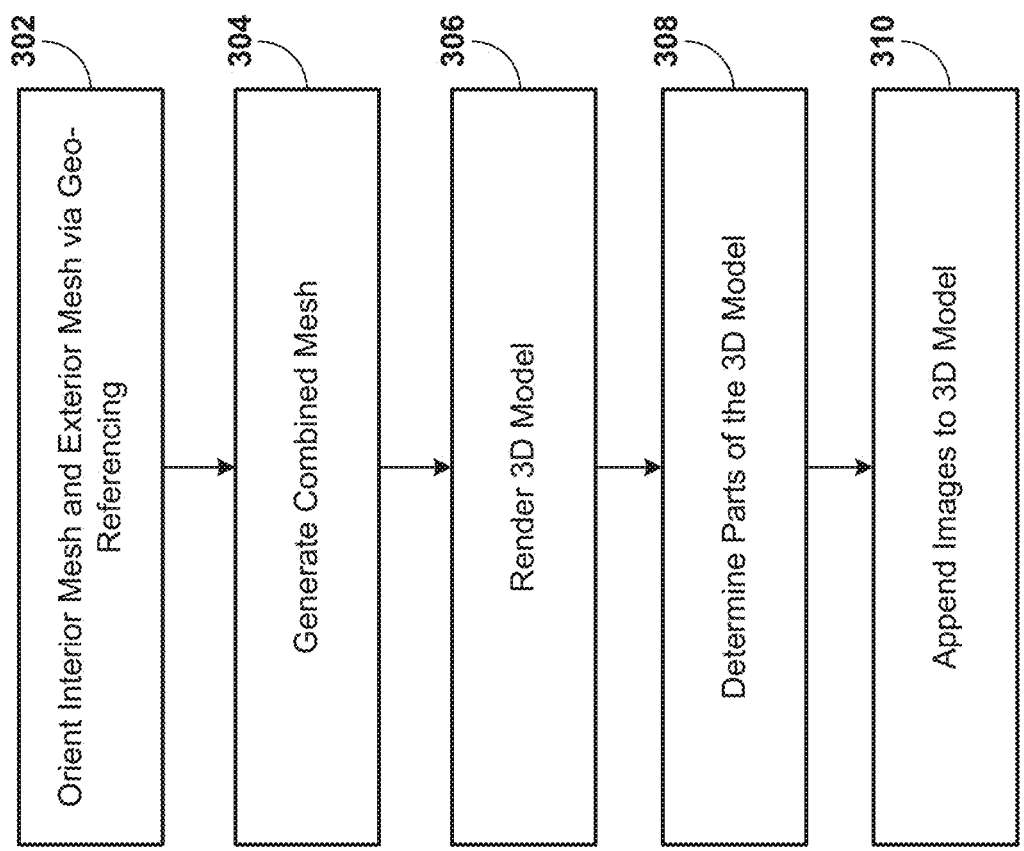
FIG. 3 is a flow chart that illustrates an example process of how a model generation and display system can create a combined mesh and use it to render a 3D model, in accordance with embodiments.

FIG. 3 is a flow chart that illustrates an example process of how a model generation and display system can create a combined mesh and use it to render a 3D model, in accordance with embodiments. In an embodiment, the example process illustrated in FIG. 3 is implemented by the model generation and display system 100.

More specifically, FIG. 3 illustrates how an interior mesh and an exterior mesh for large, complex objects possessing both internal and external features (such as buildings) can be combined into a combined mesh that is used to render a 3D model. This approach may address challenges associated with using only one of the meshes, such as using the interior mesh by itself, which only provides the net measurements inside the outer walls of the building and provides no details regarding the exterior, such as the dimensions of external features, the elevation of the building, and so forth. In contrast, by combining an exterior mesh with an interior mesh, a complete view of both the interior and the exterior of the building may be provided, with accurate interior and exterior measurements. In some embodiments, various aspects of this process may be performed by a cloud computing service.

At block 302, the model generation and display system may orient and align the interior mesh and the exterior mesh via geo-referencing. For example, there may be a first part of the interior mesh (e.g., inside the building by the front door) that is associated with a first set of GPS coordinates and a second part of the interior mesh (e.g., inside the building by the back door) that is associated with a second set of GPS coordinates. There may be a first part of the exterior mesh (e.g., outside by the front door) that is also associated with the first set of GPS coordinates and a second part of the exterior mesh (e.g., outside by the back door) that is also associated with the second set of GPS coordinates. Thus, by orienting the exterior mesh and the interior mesh based on matching or similar GPS coordinates, the exterior mesh can be overlaid onto the interior mesh so that the portion of the exterior mesh corresponding to the front door is right over the portion of the interior mesh corresponding to the front door and the portion of the exterior mesh corresponding to the back door is right over the portion of the interior mesh corresponding to the back door. The data initially used to generate the interior mesh and the exterior mesh may be captured using the techniques initially described in regards to FIGS. 1, 2A, and 2B.

At block 304, the model generation and display system may generate a combined mesh from both the interior mesh and the exterior mesh. The interior mesh and the exterior mesh can simply be combined, or they may be converted to point clouds and aggregated, with the resulting combined point cloud used to generate a combined mesh.

In some embodiments, the interior mesh and the exterior mesh may have multiple layers. For instance, if the interior of the building included furniture, then the furniture may be a separate layer within the interior mesh that can be included or not included.

At block 306, the model generation and display system may map some virtual coordinates (e.g., of a three-dimensional virtual space) to the combined mesh and use it to create a Computer-aided Design (CAD) model that can be used to render a rotating 3D model that can be split into different parts (e.g., ground floor, roof, bathroom, bedroom, kitchen, closet, and so forth). The virtual coordinates or virtual dimension may be mapped to each of the layers and used to define the boundary of the layer (or identify the location of the boundary around the layer). For each of the layers within the model, the boundaries of the layer are defined using the virtual coordinates so that it is understood how the layers are put together. In some embodiments, the position data (e.g., GPS coordinates) associated with the exterior mesh (e.g., GPS coordinates obtained by the drone imaging the exterior of the building) can also be used to tie the 3D model to an actual physical location on the planet.

At block 308, the model generation and display system may actually determine the different parts of the 3D model and split the 3D model into the different parts. In some embodiments, the model generation and display system may employ a machine learning or other artificial intelligence algorithm that can be used to determine different parts of the 3D model (e.g., this is the bedroom, this is the basement, and so forth). The machine learning algorithm may have been trained on images of the parts of various buildings (e.g., homes) in order to learn the different features that are typically associated with different kinds of rooms. For instance, the machine learning algorithm may learn to recognize the features associated with a bedroom, the features associated with a kitchen, and so forth. Thus, the machine learning algorithm may be able to scan the 3D model and any images (e.g., taken by the camera) associated with each part of the 3D model and then identify those parts of the 3D model based on the images in the training data. In some embodiments, the various parts of the 3D model may be distinguished based on metadata associated with the 3D model. For instance, different rooms of the model may be associated with different metadata to identify what that room is.

At block 310, the model generation and display system may append images to the 3D model, with the images being associated with features (e.g., rooms, floors, fixtures, etc.) represented by the 3D model. Images of internal and external features may be appended. For instance, images associated with the exterior of the building, such as drone-captured images of roof conditions or a roofing report, may be appended to the 3D model. Images associated with the interior of the building, such as 360 degree views of rooms, may be appended to the 3D model. For instance, a 360 degree image of the kitchen (e.g., taken by scanning/mapping device obtaining data for the interior mesh) can be tied to the kitchen in the model.

In some embodiments, the images may mapped to virtual coordinates of the 3D model based on the location the image was taken, which can be determined based on the metadata associated with the images. For example, a 360 degree image of the kitchen may be associated with positioning data (e.g., GPS coordinates) for where the image was taken in the building, and the corresponding virtual coordinates and view direction(s) in the 3D model can be determined and mapped to the image. This may allow the 3D model to be interactively displayed to provide a virtualized view of the building that can be manipulated (e.g., manipulations of the virtualized view may result in a change in a presented image that is tied to the manipulation).

Example of Interactive Displays

Figure 4A:
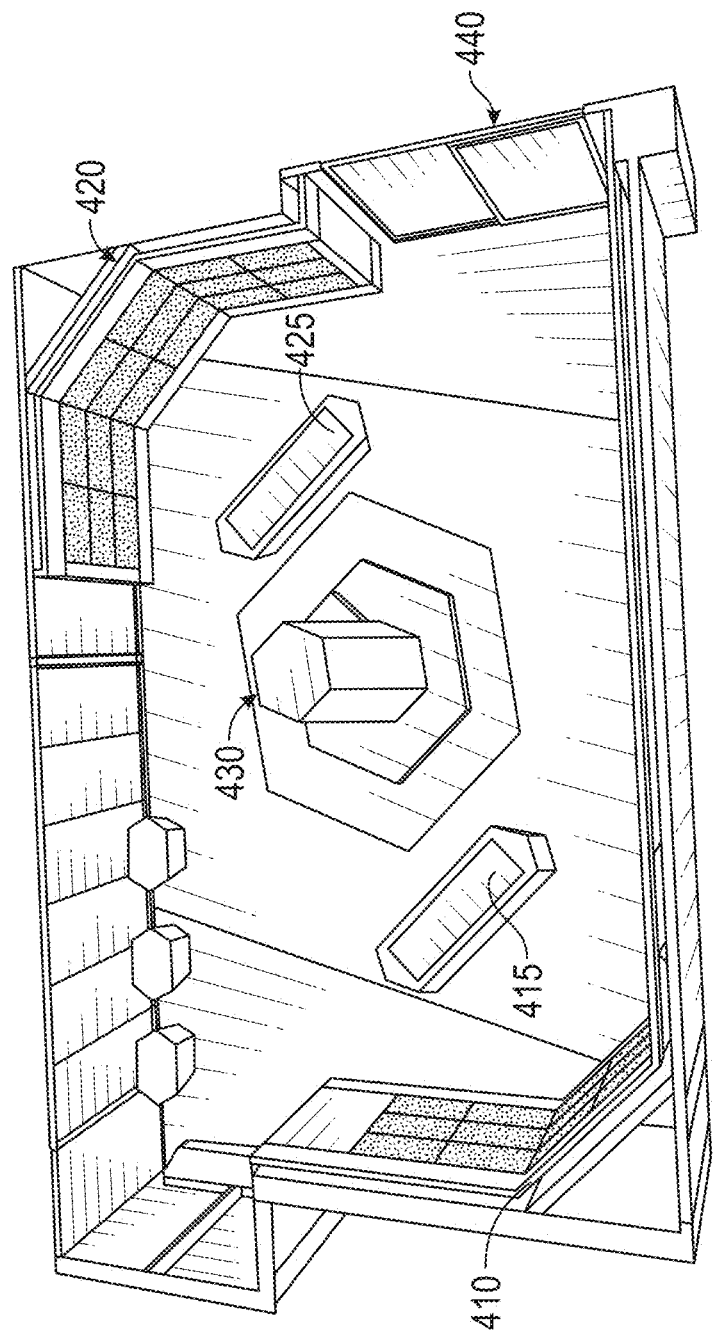
FIGS. 4A and 4B illustrate physical displays for presenting a virtualized model of a building, in accordance with embodiments of the present disclosure.
Figure 4B:
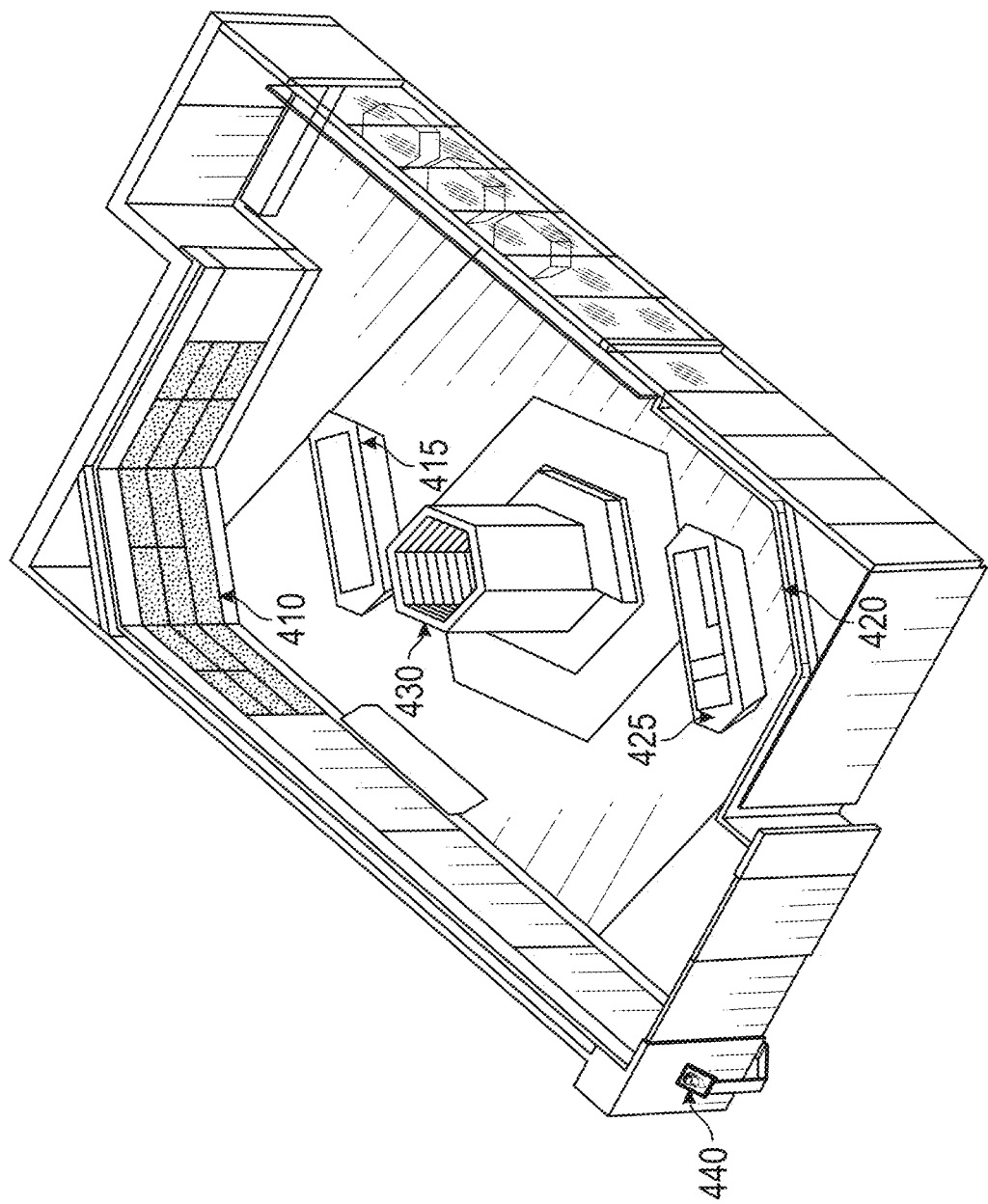

FIGS. 4A and 4B illustrate physical displays for presenting a virtualized model of a building, in accordance with embodiments of the present disclosure. More specifically, FIGS. 4A and 4B illustrate the physical displays from two different angles.

In some embodiments, there may be one or more sets of displays (e.g., two sets of displays). For instance, a multifaction monitor array 410 may be configured to display a virtualized building based on a 3D model. The display shown across the multifaction monitor array 410 may be manipulated and controlled by user inputs received via a touchscreen table 415. In some embodiments, the touchscreen table 415 may function as a touchscreen without actually having a touchscreen included therein. For example, the touchscreen table 415 can be a table that includes one or more cameras pointing at a top surface of the table, where the cameras can be used to detect gestures, hand movements, and/or symbols present on objects that correspond to certain actions or operations to perform (such as changes to the display of the multifaction monitor array 410). A computing core 430 may be configured to generate the data for displaying the virtualized building on the multifaction monitor array 410 and for processing and interpreting the user inputs received via the touchscreen table 415. Similarly, a multifaction monitor array 420 may also be configured to display a virtualized building based on a 3D model. This display shown across the multifaction monitor array 420 may be manipulated and controlled by user inputs received via a touchscreen table 425 (where the touchscreen table 425 optionally may function as a touchscreen without actually having a touchscreen included therein). The computing core 430 may also be configured to generate the data for displaying the virtualized building on the multifaction monitor array 420 and for processing and interpreting the user inputs received via the touchscreen table 425.

In some embodiments, the touchscreen tables (e.g., touchscreen tables 415 and 425) may be wide-format multitaction tables with object tracking functionality (e.g., functionality to track or detect objects, gestures, hand movements, and so forth). Objects and selections may be presented on the touchscreen tables in response to tracked objects, gestures, hand movements, etc. and selected (e.g., via a user input) in order to trigger events on the corresponding multifaction monitor array, such as changing the display of the virtualized building.

The multifaction monitor array may be referred to as an immersive data wall due to its size and scale. In some embodiments, the multifaction monitor array may actually be a single, giant monitor. In some embodiments, the multifaction monitor array may actually be a physical array of monitors (e.g., 24-screens) that are used in sync to display an end-to-end view of data, from the property level to the portfolio level. User inputs at a touchscreen table may be able to interact and control the display of data at the corresponding multifaction monitor array.

The computing core (e.g., computing core 430) may be referred to as a data core. In some embodiments, where there are multiple sets of displays (e.g., two independent displays), the computing core may include a faceted column that visually separates the room into multiple sections (e.g., two sections). For instance, the faceted column may separate the room into two sections, allowing two simultaneous user sessions at once. The computing core may have a mirrored surface that may conceal floor-to-ceiling LED displays, which can be used to activate the surface of the computing core with data visualizations, branded messaging, video, and/or programmable welcome messages.

In some embodiments, the physical displays (e.g., the multifaction monitor arrays, touchscreen tables, and computing core) may be located in a single room and access to the single room may be gated via a facial scanning interface 440, which may be a small, interactive screen dedicated to facial scanning and keyless entry.

Figure 5:
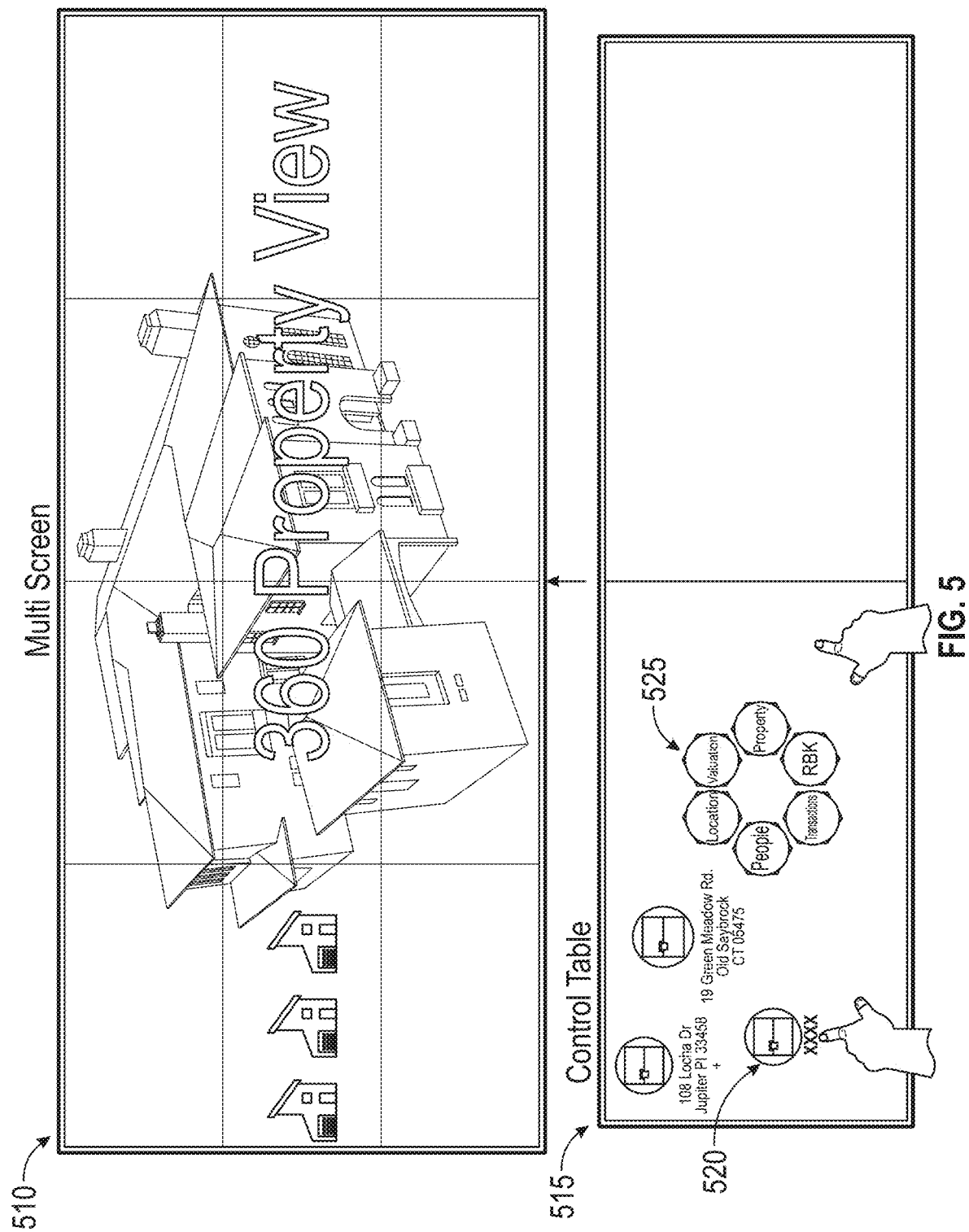
FIG. 5 illustrates an example property view of a virtualized model of a building, in accordance with embodiments of the present disclosure.

FIG. 5 illustrates an example property view of a home, in accordance with embodiments of the present disclosure.

More specifically, a touchscreen table 515 (also referred to herein as a "control table") may be able to provide details regarding various properties (e.g., buildings) upon request.

For instance, the touchscreen table 515 may illustrate a small graphical button 520 for a specific property (e.g., a building or home model), as well as buttons corresponding to other properties. This can be useful if the user is a homebuyer or appraiser that wishes to look at a particular property by selecting it on the touchscreen table 515. If the user selects the button 520 of the property on the touchscreen table 515, a navigation menu 525 associated with that particular property may be presented on the touchscreen table 515. In some embodiments, the address of the selected property may be displayed under the navigation menu 525. The navigation menu 525 may include various selections for obtaining additional information about the building, including "People", "Location", "Valuation", "Property", "Risk", and "Transactions." A landing screen may be displayed on the multifaction monitor array 510 until a particular view is selected by navigating through the various options in the navigation menu 525. For instance, the landing screen may show the virtualized building based on the corresponding 3D model, without additional details.

In some embodiments, the options shown in the navigation menu 525 of FIG. 5 may be first level options, and selecting one of those options may open up a sub-menu with additional options. For instance, selecting the "Property" option may open up a sub-menu with additional options, such as "Roof Measurements", "Roof Conditions", "Characteristics", "Structure Area", "Property Area", "HOA/COA", and "Utilities", which are shown in the submenus (e.g., submenus 625 and 627) of FIGS. 6A-6C.

Figure 6A:
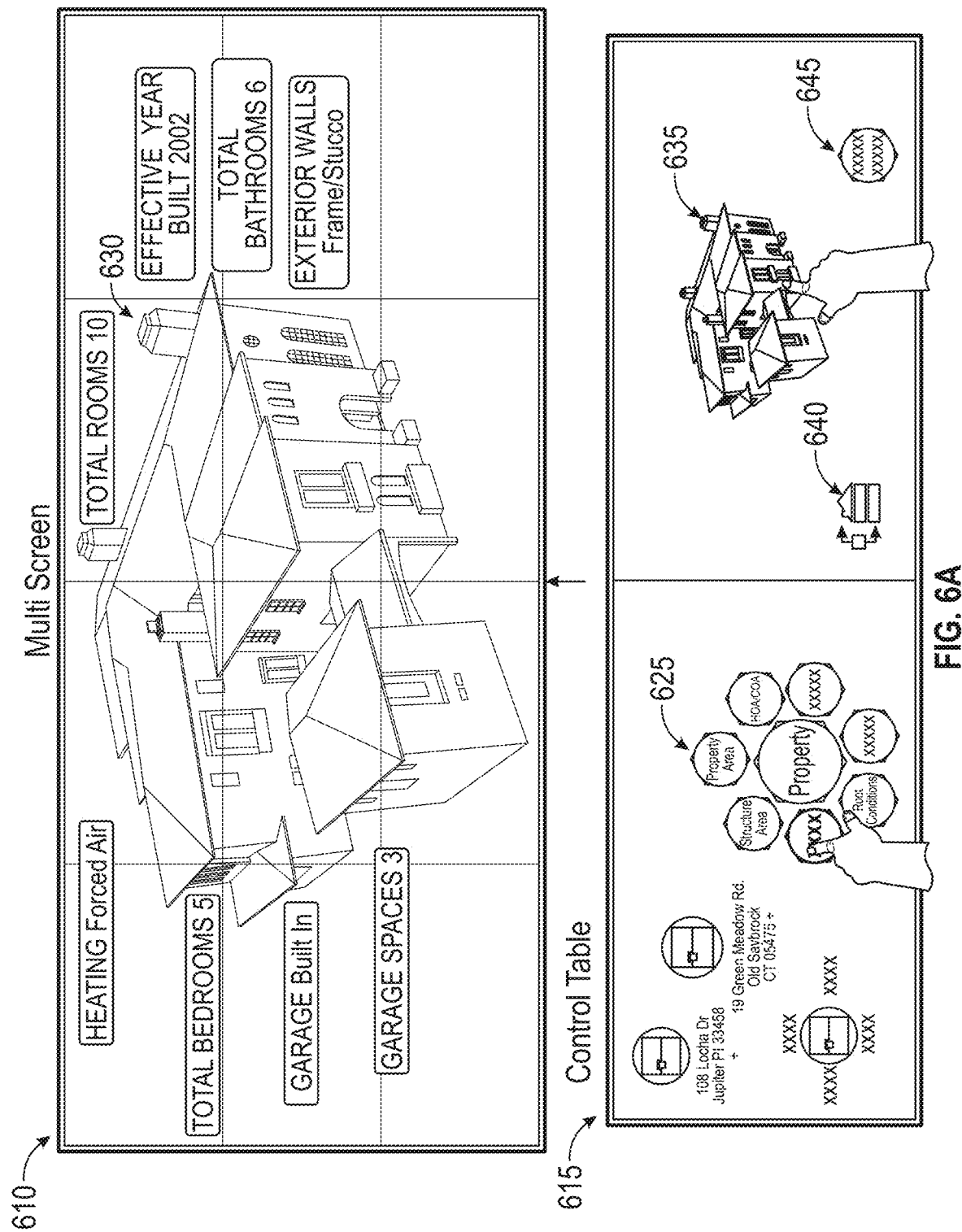
FIGS. 6A and 6B illustrate example views for displaying property characteristics and the exterior of virtualized model of a building, in accordance with embodiments of the present disclosure.
Figure 6B:
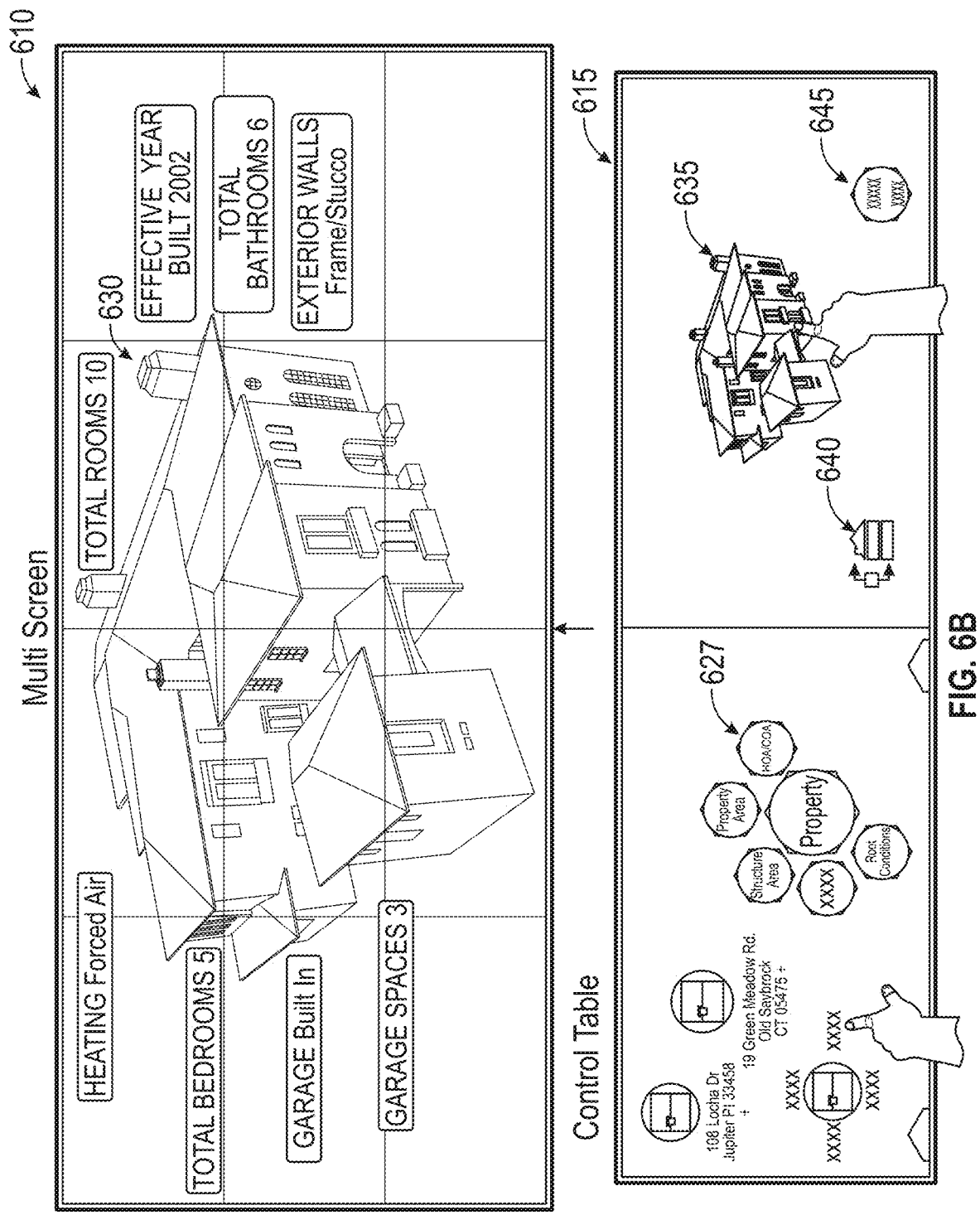

FIGS. 6A and 6B illustrate example views for displaying property characteristics and the exterior of virtualized model of a building, in accordance with embodiments of the present disclosure.

More specifically, once a particular property (e.g., building) has been specified and the "Property" option is selected in the navigation menu 525, a submenu 625 may be displayed on the touchscreen table 615 that allows more information about the property to be displayed. The submenu 625 may provide additional options to review different aspects of the building. In some embodiments, the submenu 625 associated with the "Property" selection may include options such as "Roof Measurements", "Roof Conditions", "Characteristics", "Structure Area", "Property Area", "HOA/COA", and "Utilities".

The different options in the submenu 625 may pull up different views on the multifaction monitor array 610. For instance, selecting "Characteristics" in the submenu 625 may allow the user to view property characteristics associated with the building. More specifically, selecting that option may bring up a view 630 that is a 360 degree property view of the exterior of the home on the multifaction monitor array 610. The view 630 may also include descriptions of various characteristics associated with the home, including characteristics such as the number of garage spaces, the type of garage, the number of bedrooms, the type of heating, the number of rooms, the effective year the home was built, the number of bathrooms, and the material of the exterior walls.

In some embodiments, a user interface element 635 representing the exterior of the home may also be presented on the touchscreen table 615, which mirrors the orientation of the building model shown in view 630. The building model in view 630 may be rotatable based on the user interface element 635. For instance, the user may be able to manipulate the user interface element 635, such as by sliding a finger across the user interface element 635. The corresponding manipulation can then be performed automatically on the building model shown in view 630. For instance, if the user slides a finger over the user interface element 635 in order to rotate the user interface element 635 to the right, then the displayed home in the view 630 may similarly rotate to the right automatically.

In some embodiments, a house toggle 640 may be presented on the touchscreen table 615, which allows the user to select through the options of seeing the whole house, individual floors, individual rooms, and/or the roof. For instance, if the user deselects the roof in the house toggle 640, the roof of the building model in view 630 may be removed.

In some embodiments, a media player button 645 may be presented on the touchscreen table 615, which allows the user to display video on the multifaction monitor array 610. For instance, if there is video of drone footage (e.g., drone-captured video) nested in the upper left corner of the multifaction monitor array 610, selecting the media player button 645 may expand that video to a full screen takeover of the multifaction monitor array 610.

Figure 6C:
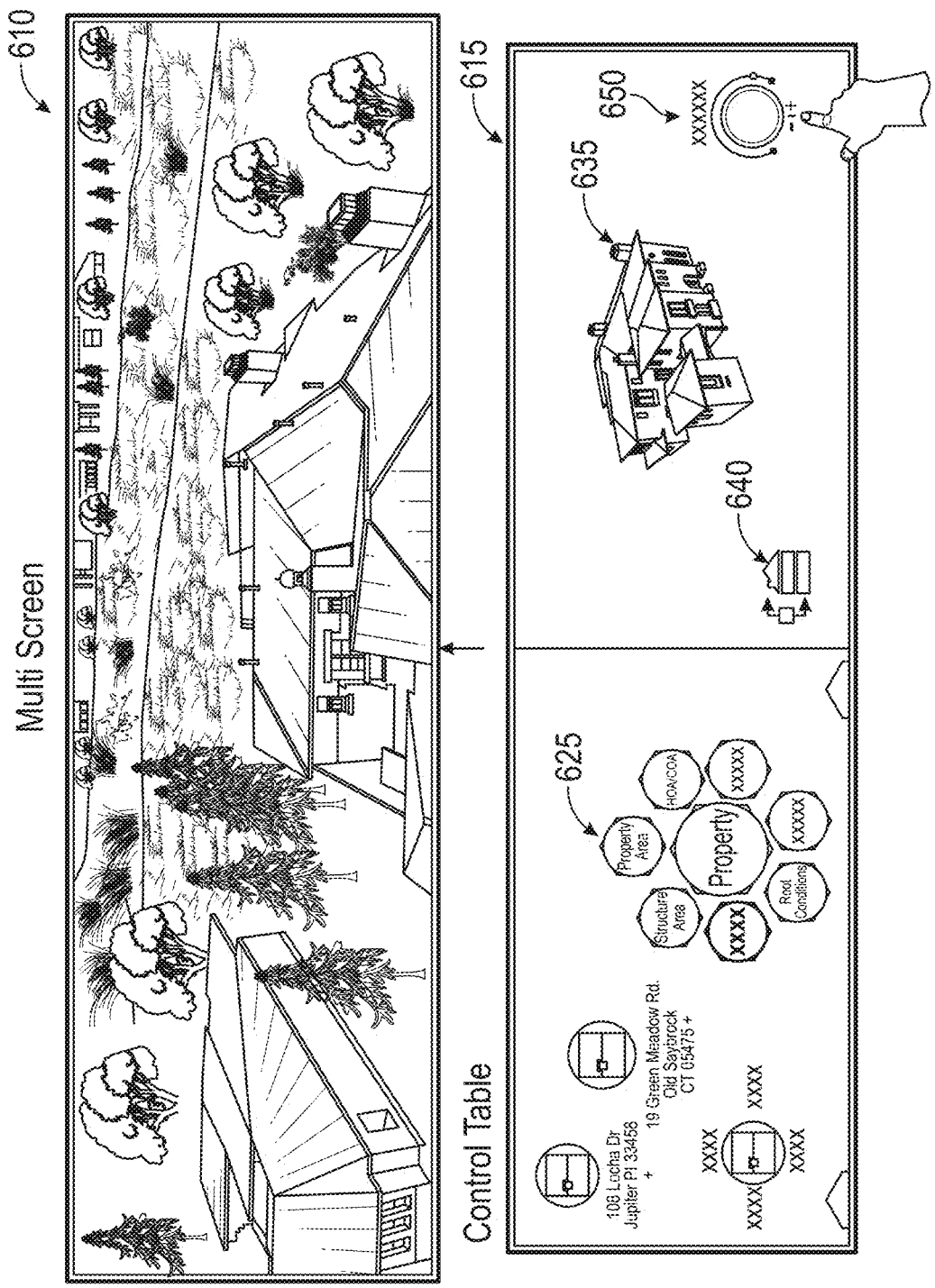
FIG. 6C which illustrates an example display of drone footage video captured for the exterior of a building, in accordance with embodiments of the present disclosure.

A more specific example of this is demonstrated in FIG. 6C, which illustrates an example display of drone footage video captured for the exterior of a home (e.g., by the drone or other manned or unmanned aerial vehicle that captured data used to generate the exterior mesh of the building) that is presented on the multifaction monitor display 610 if the media player button 645 labeled "Drone Footage Video" (shown in FIGS. 6A and 6B) is selected. A controller puck 650 may be presented (e.g., in the same space that the media player button 645 occupied) that allows the user to control playback of the video being presented on the multifaction monitor display (e.g., pause/play the video, fast forward or rewind the video, skip to a particular chapter in the video, jog through the drone footage video to the end, and so forth).

Figure 7:
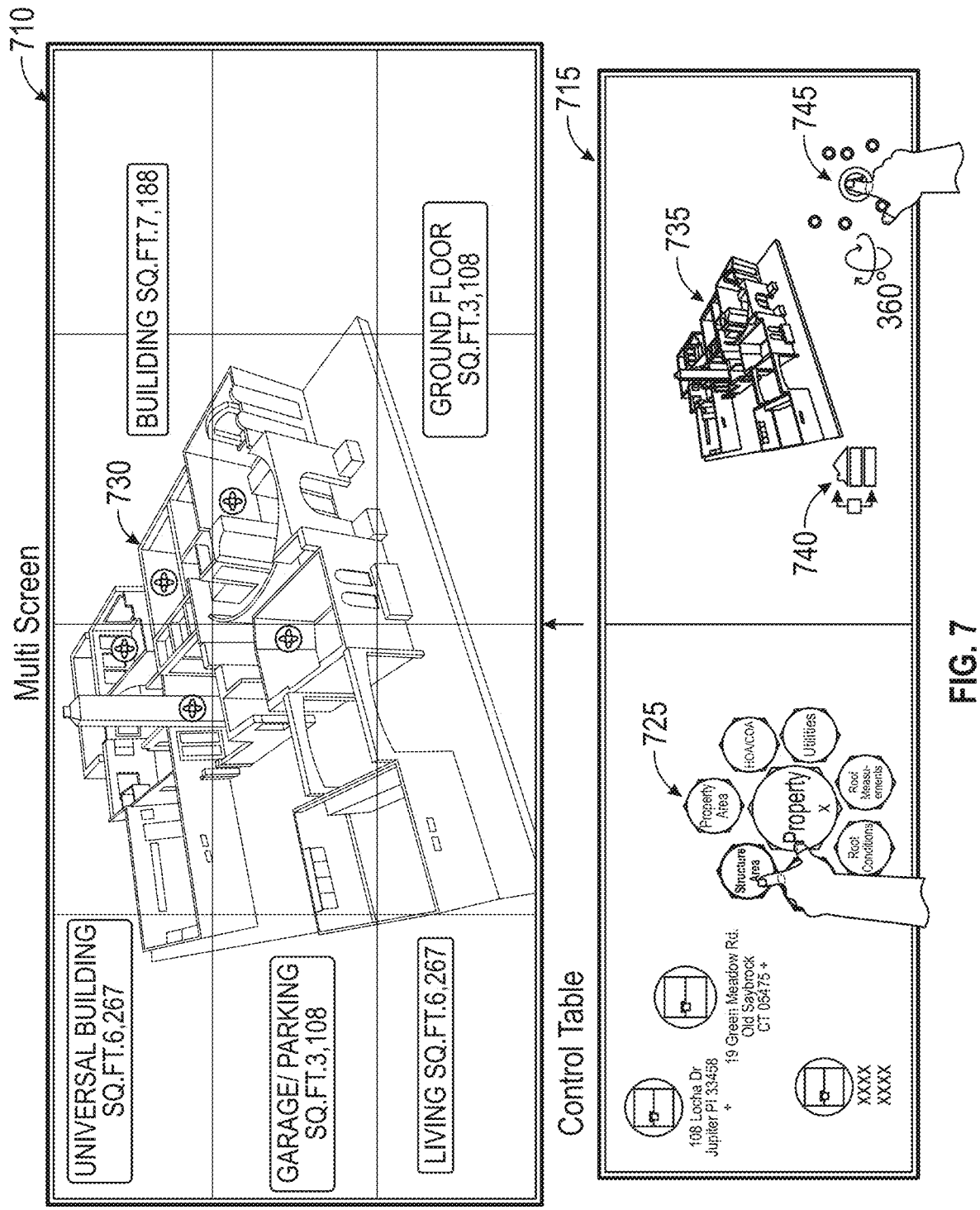
FIG. 7 illustrates an example view of 360 degree image appended to a virtualized model of a building, in accordance with embodiments of the present disclosure.

FIG. 7 illustrates an example view of the structure area of a virtualized model of a building, in accordance with embodiments of the present disclosure.

More specifically, once a user has selected particular property via the touchscreen table 715 and selected the "Property" option within a navigation menu (such as the navigation menu 525 in FIG. 5, which presents numerous first level options including "People", "Location", "Valuation", "Property", "Risk", and "Transactions"), the submenu 725 may be presented through the touchscreen table 715. The submenu 725 may include options such as "Roof Measurements", "Roof Conditions", "Characteristics", "Structure Area", "Property Area", "HOA/COA", and "Utilities", which are similar to the options shown in the submenus (e.g., submenus 625 and 627) of FIGS. 6A-6C.

One of the options (e.g., the "Structure Area" selection) in the submenu 725 may allow the user to view the structure area associated with the property. In particular, selecting that option may bring up a view 730 that is a 360 degree view of the structure area of the home on the multifaction monitor array 710. The view 730 may also display various characteristics associated with the structure area of the home, such as the square footage of various areas (e.g., the building square footage, the ground floor square footage, the living space square footage, the garage/parking square footage, the universal building square footage, and so forth).

A house toggle 740 may be presented on the touchscreen table 715, which allows the user to select through the options of seeing the whole house, individual floors, individual rooms, and/or the roof. For instance, if the user deselects the roof in the house toggle 740, the roof of the building model displayed in view 730 may be removed to reveal a cutaway view of the interior structure of the home (e.g., as shown in FIG. 7).

A user interface element 735 may also be presented on the touchscreen table 715, which may have an appearance that mirrors the building model presented in view 730. The building model in view 730 may be rotatable based on the user interface element 735. For instance, the user may be able to manipulate the user interface element 735, such as by sliding a finger across the user interface element 735. The corresponding manipulation can then be performed automatically on the building model shown in view 730. For instance, if the user slides a finger over the user interface element 735 in order to rotate the user interface element 735 to the right, then the displayed home in the view 730 may similarly rotate to the right automatically.

Both the user interface element 735 and the building model presented in view 730 may display icons associated with various features of the building. For instance, in FIG. 7, both the user interface element 735 and the building model presented in view 730 have "360°" icons associated with various rooms of the building. Those icons may indicate the availability of 360 degree images associated with those rooms. Selecting one of those icons on the user interface element 735 may load up the 360 degree image associated with the target location and there may be a user interface element 745 that may allow the 360 degree image to be expanded.

Figure 8:
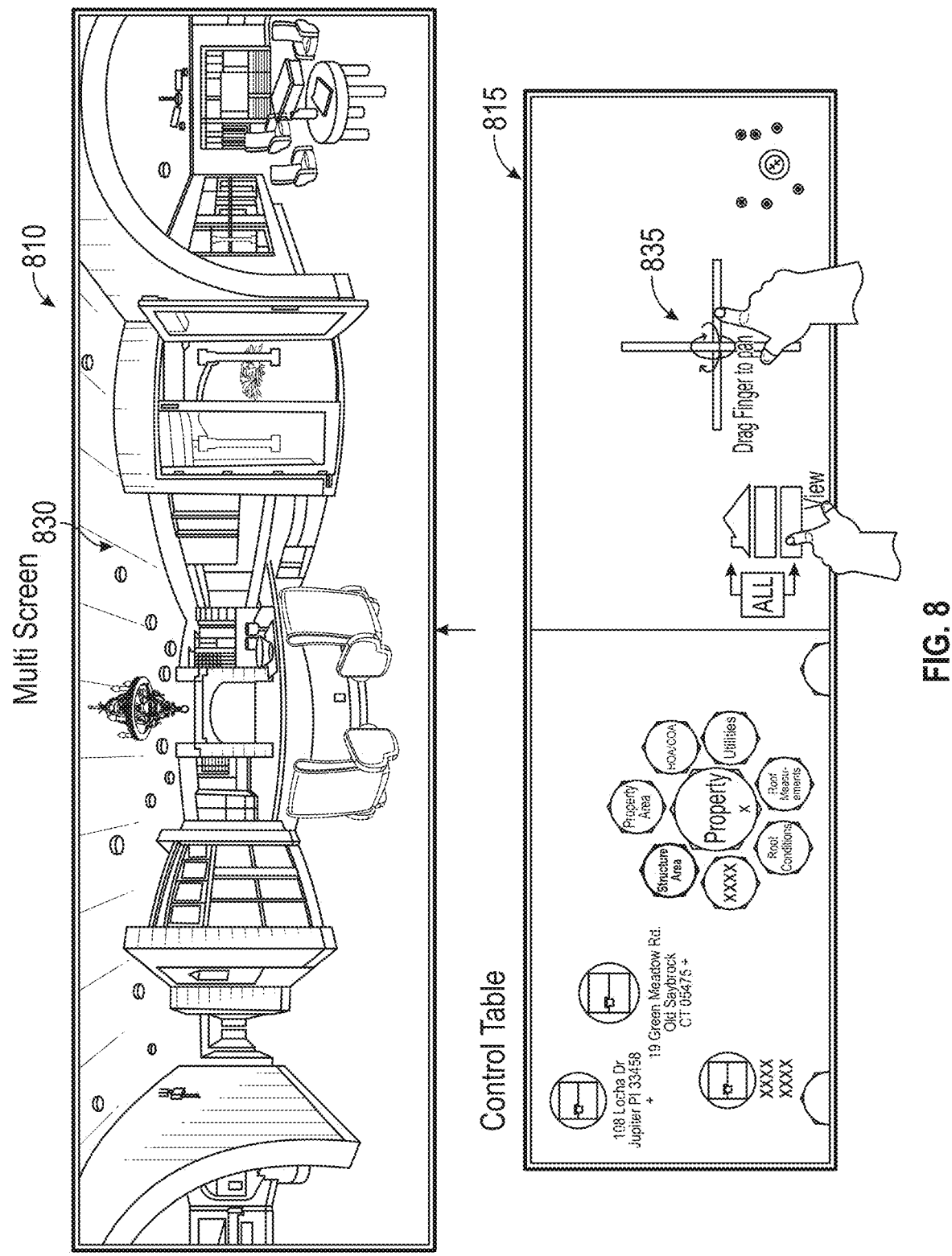
FIG. 8 illustrates an example view of the structure area of a virtualized model of a building, in accordance with embodiments of the present disclosure.

More specifically, once a target location with an associated 360 degree image is selected, the 360 degree image may be displayed on the multifaction monitor display 710 with a point-of-view (POV) at the center of rotation. As shown in FIG. 8, selecting the user interface element 745 may expand this image to full screen on the view 830 of the multifaction monitor display 810. Once the image has been toggled to full screen, the user may be able to rotate the POV of the camera by providing user inputs (e.g., finger swipes) to the user interface element 835 that is displayed on the touchscreen table 815. The user interface element 835 may be a two-dimensional control that enables the user to rotate the camera perspective of the 360 degree image in a 360 degree manner (e.g., including looking up and looking down).

In some embodiments, the touchscreen table 815 may display the user interface element 735 (e.g., a 3D model of a building) rather than the user interface element 835 (e.g., a two-dimensional control) as the image is shown full screen in the view 830. The user, however, may be able to perform the same actions described above to rotate the camera perspective of the 360 degree image shown in the view 830. For instance, the user can slide a finger over the user interface element 735 (e.g., from right to left) in order to rotate the user interface element 735 in a clockwise motion, which may cause the image shown in the view 830 to rotate automatically in a clockwise motion. Similarly, if the user slides a finger over the user interface element 735 (e.g., from left to right) in order to rotate the user interface element 735 in a counterclockwise motion, the image shown in the view 830 may rotate automatically in a counterclockwise motion. If the user slides a finger over the user interface element 735 (e.g., from bottom to top) such that the near edge of the user interface element 735 (e.g., the edge of the user interface element 735 that appears closer to the user) rotates from bottom to top in a clockwise direction, the image shown in the view 830 may rotate automatically such that it appears to the user as if the user is looking in a more downward direction (e.g., the image rotates such that more of the ground and less of the ceiling is visible). If the user slides a finger over the user interface element 735 (e.g., from top to bottom) such that the near edge of the user interface element 735 (e.g., the edge of the user interface element 735 that appears closer to the user) rotates from top to bottom in a counterclockwise direction, the image shown in the view 830 may rotate automatically such that it appears to the user as if the user is looking in a more upward direction (e.g., the image rotates such that more of the ceiling and less of the ground is visible). The user may slide a finger (or any other pointing device, such as a stylus, mouse, etc.) over the user interface element 735 in any combination of directions to achieve 360 degrees of possible rotations of the image shown in the view 830. Thus, the touchscreen table 815 may depict a 3D model of a building and the multifaction monitor display 810 may display an actual image of the building, and the user can manipulate the 3D model of the building shown on the touchscreen table 815 to cause an automatic manipulation of the image of the building shown on the multifaction monitor display 810.

Figure 9:
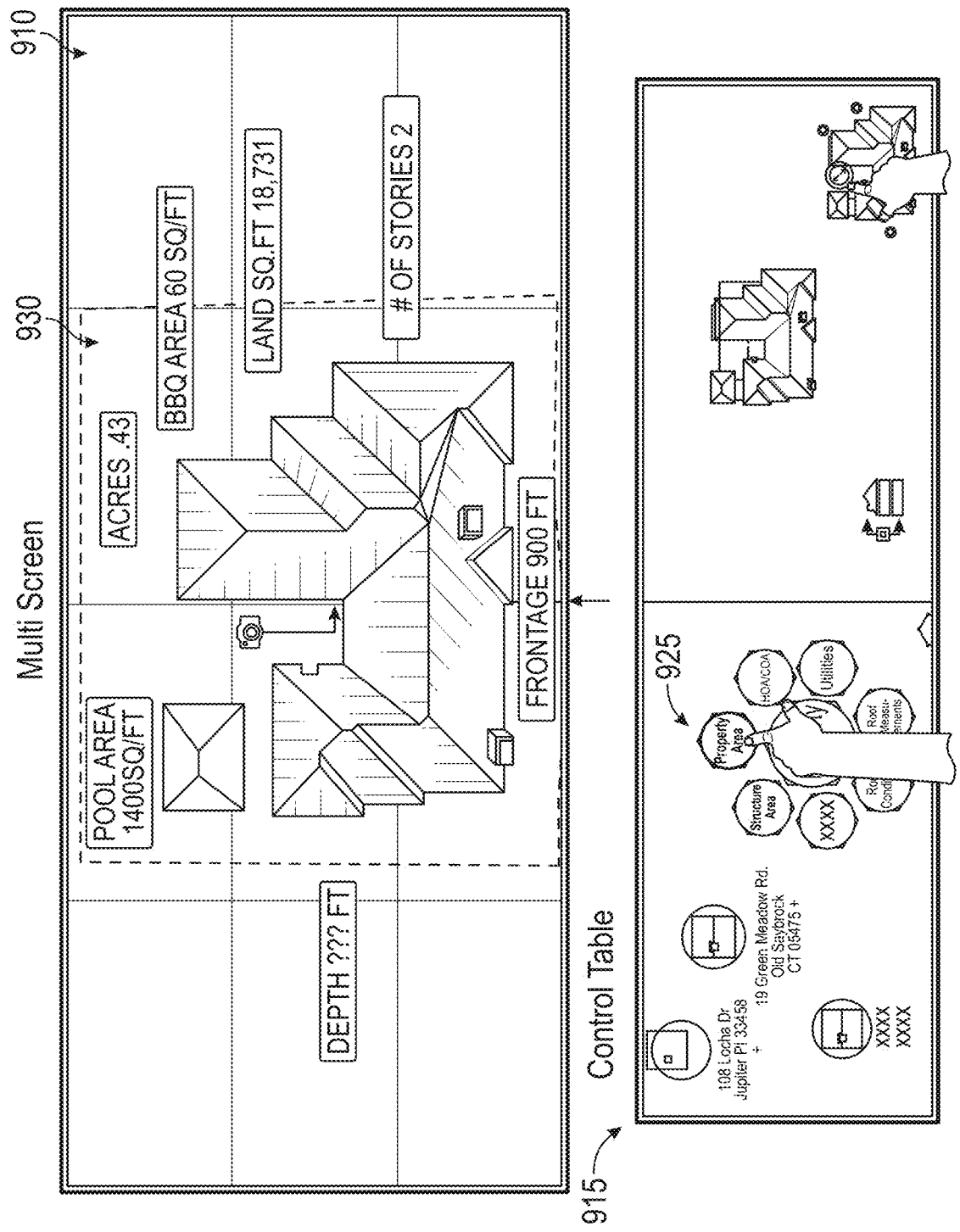
FIG. 9 illustrates an example view of the property area of a virtualized model of a building, in accordance with embodiments of the present disclosure.

FIG. 9 illustrates an example view of the property area of a virtual model of a building, in accordance with embodiments of the present disclosure.

In some embodiments, once a particular object (e.g., building, furniture, an appliance, or any other physical structure) has been selected, a menu 925 may be displayed on the touchscreen table 915 that allows more information about the object to be displayed. For buildings, the menu 925 may provide options to review different aspects of the building (e.g., mortgage, insurance, real estate) as well as show the address of the building. In some embodiments, the menu 925 may include options for different kinds of information about the building to be pulled up, such as "Roof Conditions", "Roof Measurements", "Characteristics", "Structure Area", "Property Area", "HOA/COA", and "Utilities", depending on what information is available.

One of the options (e.g., the "Property Arca" selection) in the menu 925 may cause the view 930 displayed on the multifaction monitor array 910 to auto position to a top down plan view of the roof of the building model. The view 930 may also display various characteristics associated with the property area of the home, such as the square footage of various areas (e.g., the pool area, the bbq area, the land, the frontage, and so forth), as well as the depth and number of stories for the property.

In some embodiments, the view 930 may also show icons or data flags associated with hotspots around the property area (e.g., external features). Selecting one of icons or data flags associated with the hotspots may trigger and expand the display of an image associated with the hotspot (e.g., captured with the data used to build the exterior mesh) on the view 930. The direction and location of the image may also be displayed on the view 930.

Figure 10:
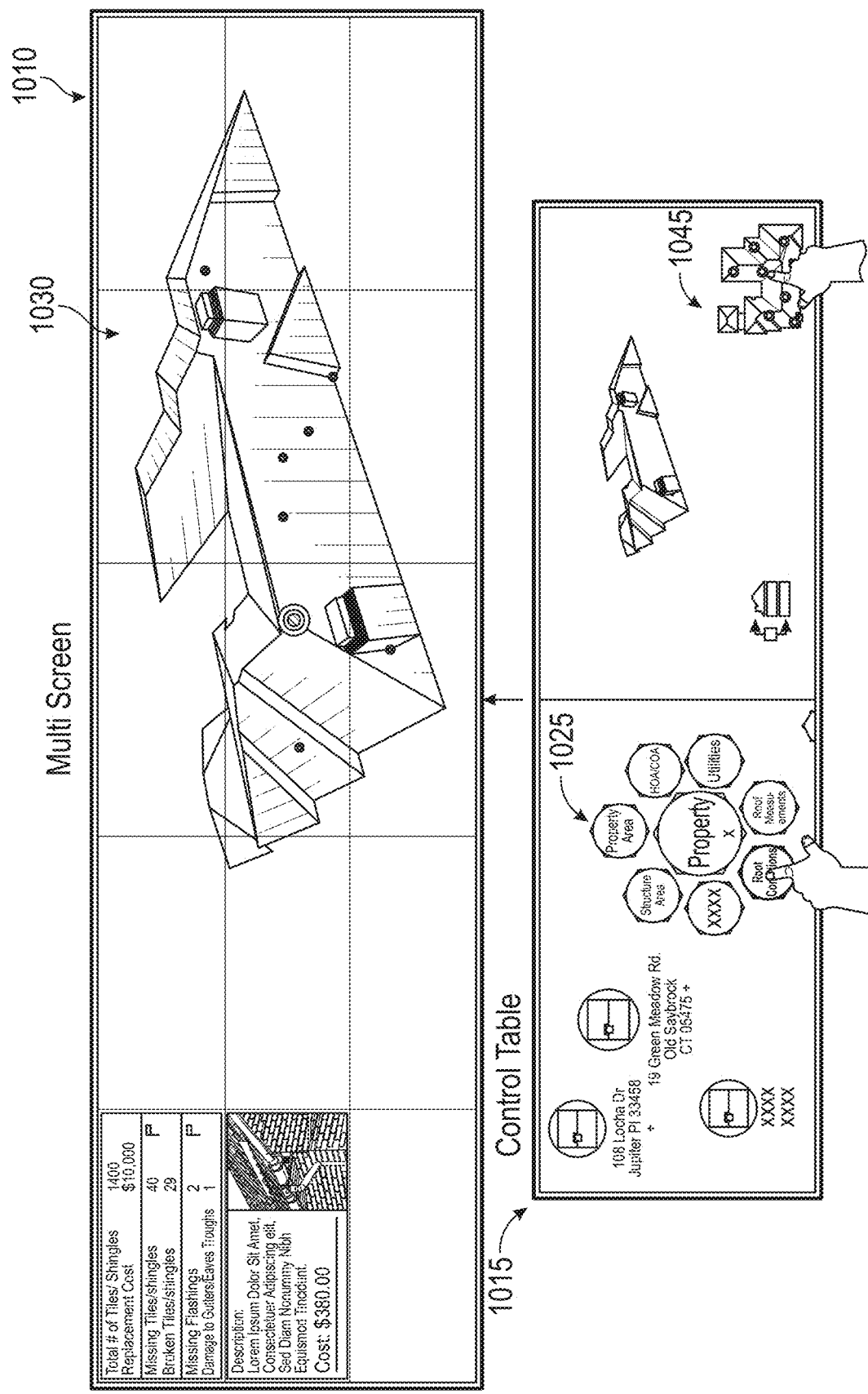
FIG. 10 illustrates an example view of the roof condition of a virtualized model of a building, in accordance with embodiments of the present disclosure.

FIG. 10 illustrates an example view of the roof condition of a virtualized model of a building, in accordance with embodiments of the present disclosure.

In some embodiments, once a particular object (e.g., building, furniture, an appliance, or any other physical structure) has been selected, a menu 1025 may be displayed on the touchscreen table 1015 that allows more information about the object to be displayed. For buildings, the menu 1025 may provide options to review different aspects of the building (e.g., mortgage, insurance, real estate) as well as show the address of the building. In some embodiments, the menu 925 may include options for different kinds of information about the building to be pulled up, such as "Roof Conditions", "Roof Measurements", "Characteristics", "Structure Area", "Property Area", "HOA/COA", and "Utilities", depending on what information is available.

One of the options (e.g., the "Roof Conditions" selection) in the menu 1025 may cause the view 1030 displayed on the multifaction monitor array 1010 to show a view of the roof of the building model with hotspot problem areas. The view 1030 may also present some additional information associated with the roof conditions, such as the total number of tiles/shingles, the replacement cost for the roof, the number of missing tiles/shingles, the number of broken tiles/shingles, the number of missing flashings, and the damage to gutters/eaves troughs.

A user interface element 1045 shown on the touchscreen table 1015 may also provide a corresponding view of the roof of the building model along with the hotspot problem areas, except the user may be able to select one of the hotspot problem areas on the user interface element 1045 via a user input (e.g., touching a finger to a hotspot). Selecting one of the hotspot problems areas may bring up additional information associated with the hotspot problem area (e.g., description, cost, and image). In some cases, there may be a toggle to display the image associated with the hotspot problem area in full screen on the multifaction monitor array 1010.

Figure 11:
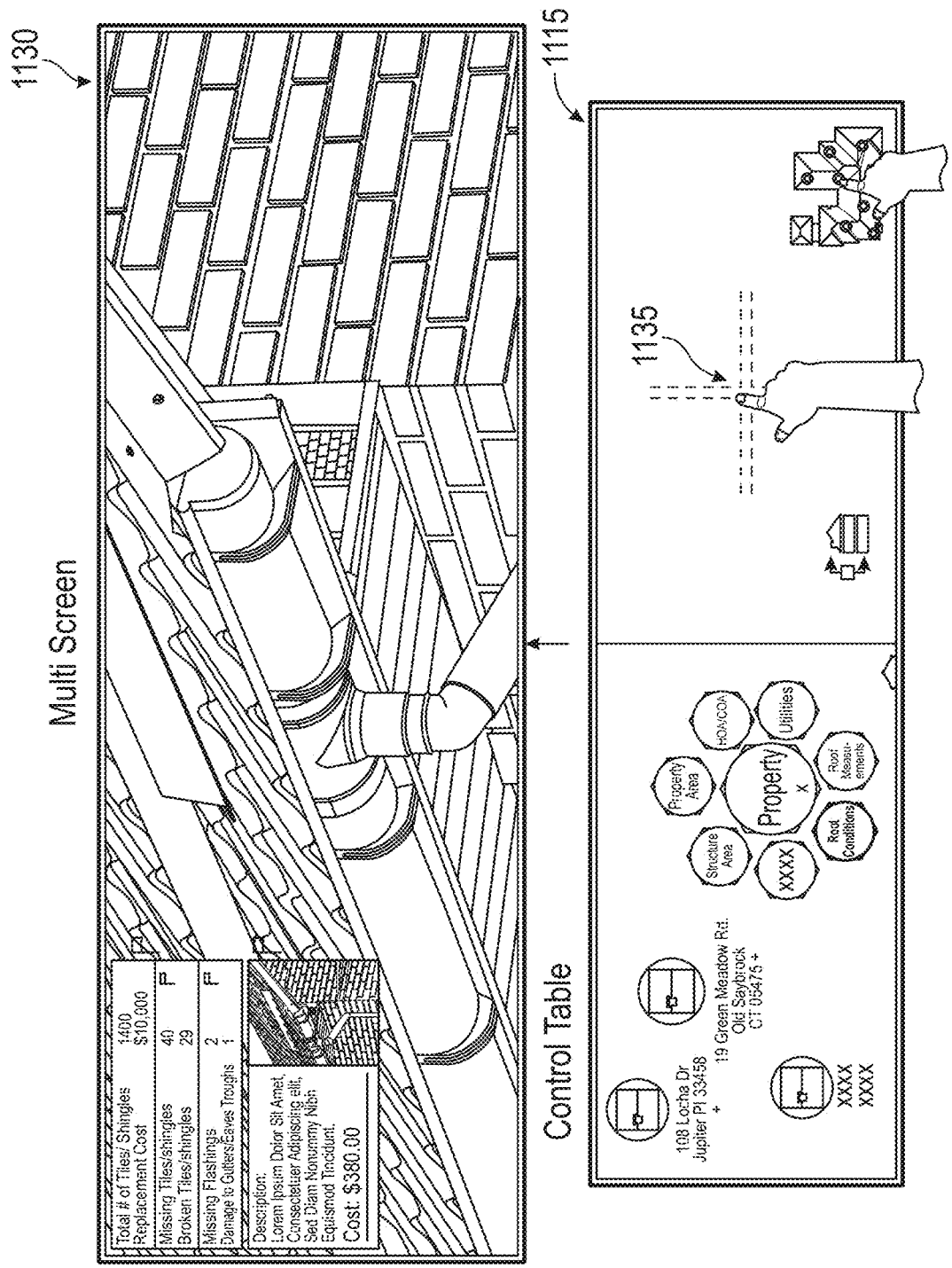
FIG. 11 illustrates an example view of an image of a problem area appended to a virtualized model of a building, in accordance with embodiments of the present disclosure.

As a specific example of this, FIG. 11 illustrates a view 1130 demonstrating how an image of a hotspot problem area (e.g., a section of the roof) can be expanded to full screen and additional context information associated with that hotspot problem area (e.g., description, cost, and image) can also be presented (e.g., overlaid on the full screen image).

A user interface element 1135 on the touchscreen table 1115 may enable the user to drag and scale the image being presented (e.g., in full screen) via user inputs such as simple swipe motions and pinch scaling. For example, the user may pinch two fingers together on the user interface element 1135 in order to zoom out the image shown in view 1130. As described herein, the touchscreen table 1115 can alternatively display a 3D model of the building rather than the user interface element 1135, but the user can perform the same actions to manipulate the image in the view 1130.

Figure 12A:
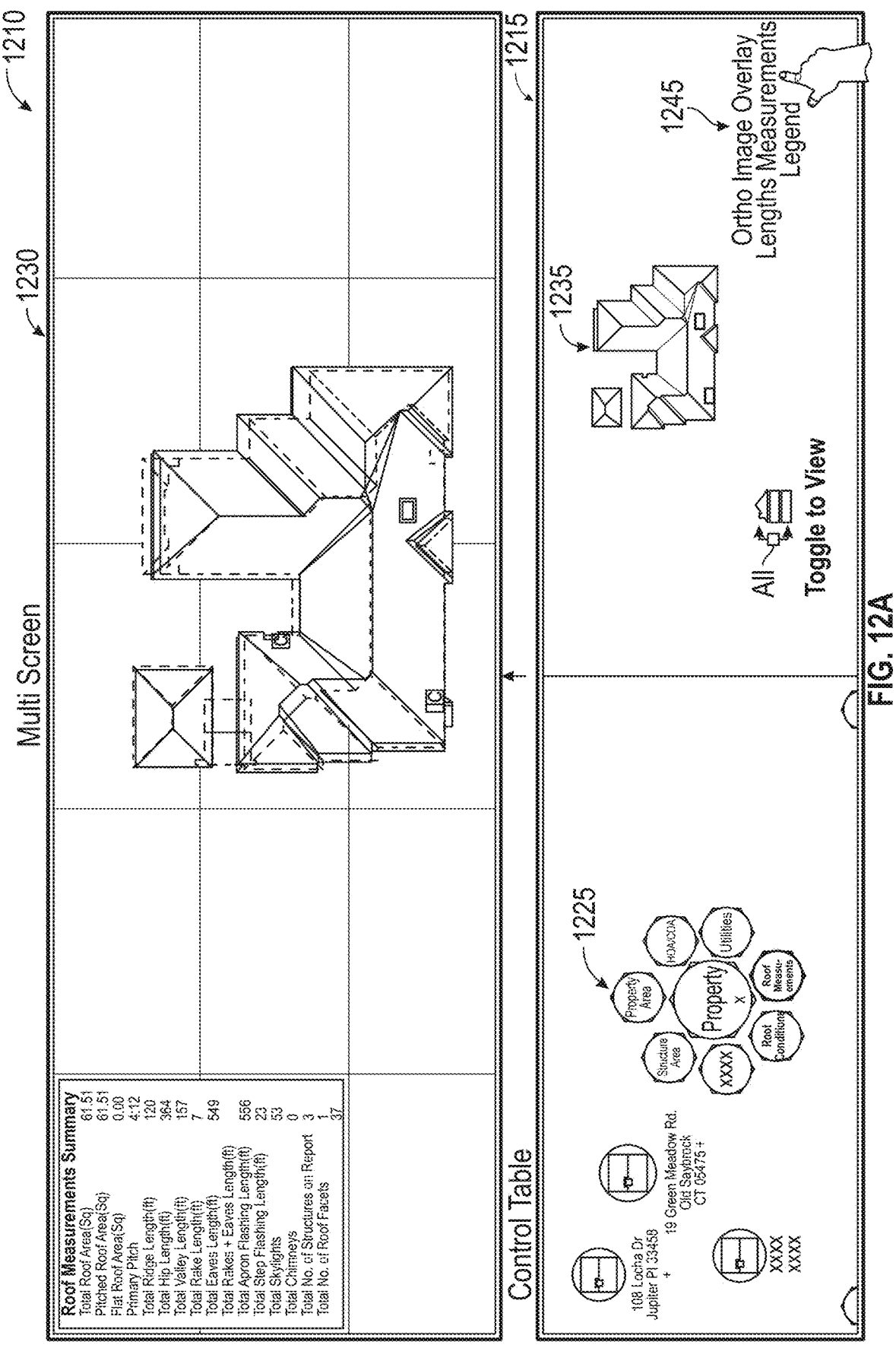
FIG. 12A illustrates an example view of the roof measurements of a virtualized model of a building, in accordance with embodiments of the present disclosure.

FIG. 12A illustrates an example view of the roof measurements of a virtualized model of a building.

In some embodiments, once a particular object (e.g., building, furniture, an appliance, or any other physical structure) has been selected, a menu 1225 may be displayed on the touchscreen table 1215 that allows more information about the object to be displayed. For buildings, the menu 1225 may provide options to review different aspects of the building (e.g., mortgage, insurance, real estate) as well as show the address of the building. In some embodiments, the menu 1225 may include options for different kinds of information about the building to be pulled up, such as "Roof Conditions", "Roof Measurements", "Characteristics", "Structure Area", "Property Area", "HOA/COA", and "Utilities", depending on what information is available.

One of the options (e.g., the "Roof Measurements" selection) in the menu 1225 may cause the view 1230 displayed on the multifaction monitor array 1210 to show a view of the roof of the building model with various measurements associated with the roof. The view 1230 may also present some additional descriptive information associated with the roof measurements, such as a roof measurements summary that includes the total roof area, pitched roof area, flat roof area, primary pitch, total ridge length, total hip length, total valley length, total rake length, total eaves length, total rakes+eaves length, total apron flashing length, total step flashing length, total skylights, total chimneys, total number of structures on report, total number of roof facets, and so forth.

Figure 12B:
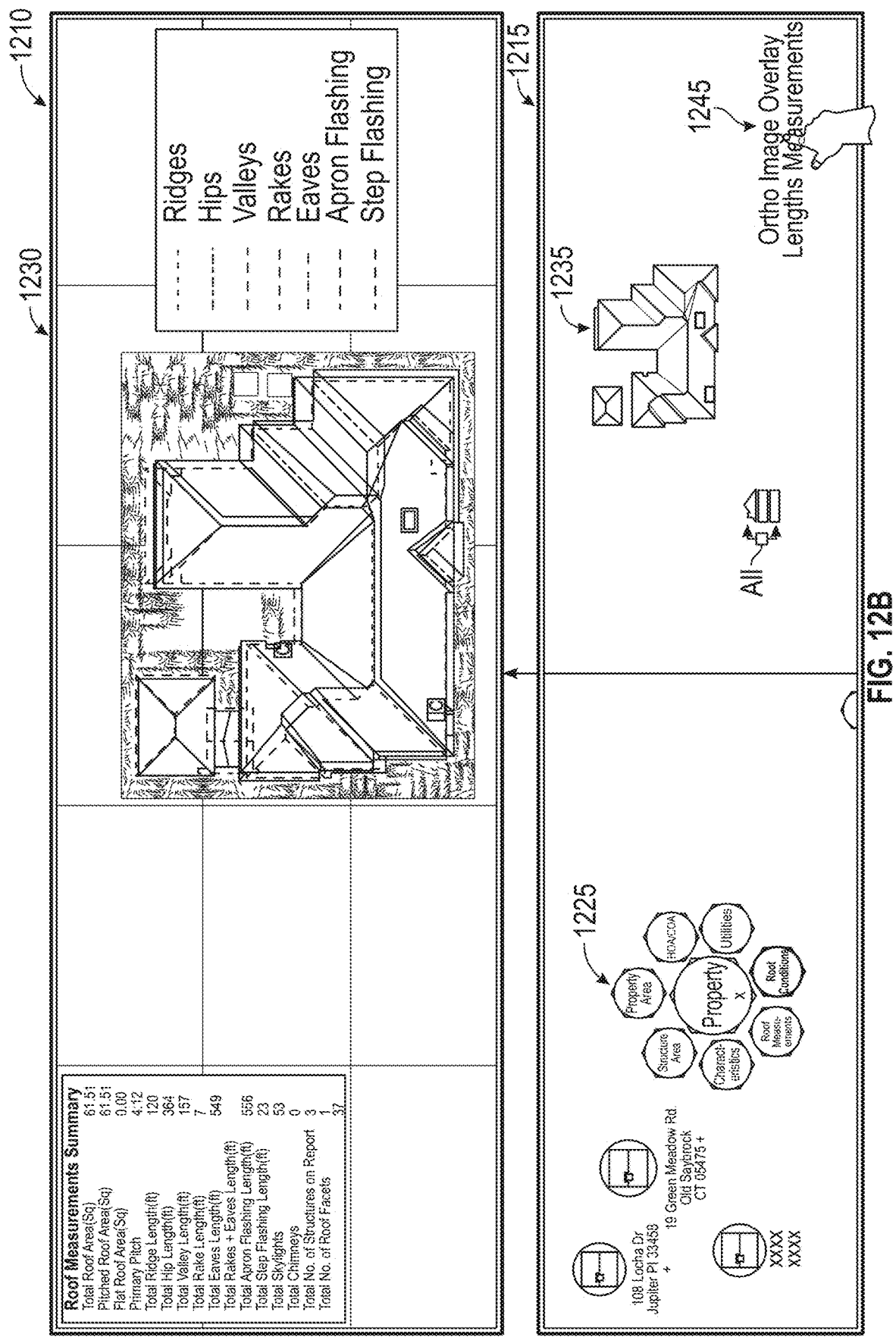
FIG. 12B illustrates an example view of the roof measurements of a virtualized model of a building, in accordance with embodiments of the present disclosure.

A user interface element 1235 shown on the touchscreen table 1215 may also provide a corresponding view of the roof of the building model. There may also be a user interface element 1245 shown on the touchscreen table 1215 that enables a user to select between options for what is presented on the view 1230. The options may include an ortho image overlay, which may be a drone deploy ortho-image that shows a 2D plan view of the property. The options may include a 2D roof morphology overlay from drone deploy roof modes. The options may include a measurement table (e.g., showing all the different measurements) and legend (e.g., roof report). In particular, selecting the option for ortho image overlay results in the display on the multifaction monitor array 1210 shown in FIG. 12B. The drone deploy orthoimage (e.g., captured by the drone or other manned or unmanned aerial vehicle flying overhead) is overlaid onto the roof of the building model (e.g., like a texture) in order to provide additional visual details of the property.

Figure 13:
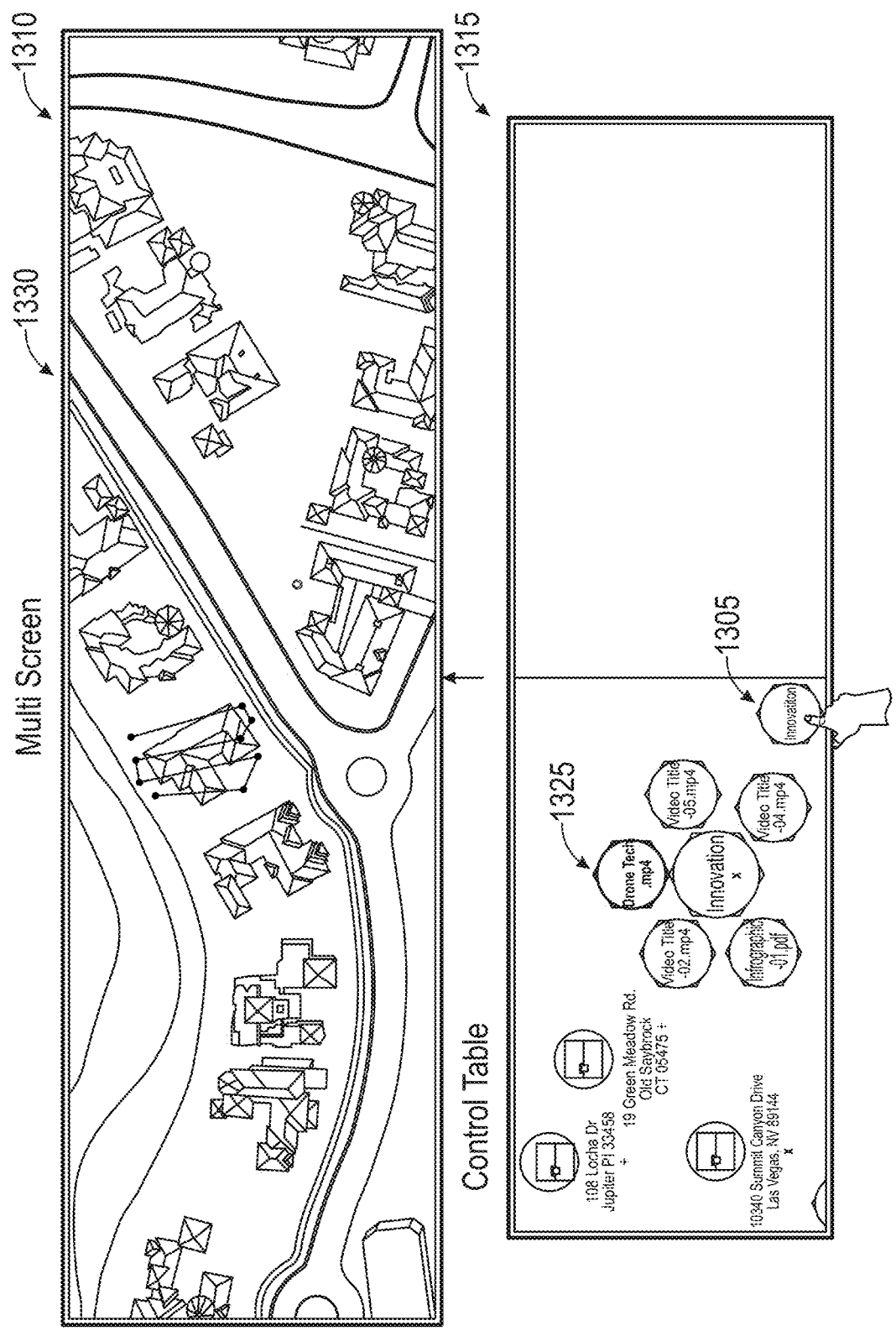
FIG. 13 illustrates an example view showing an overhead drone flight path over a building, in accordance with embodiments of the present disclosure.

FIG. 13 illustrates an example view showing an overhead drone flight path over a home.

In some embodiments, the touchscreen table 1315 may have an innovation button 1305, although the innovation button 1305 may be partially hidden in some cases. When a user selects the innovation button 1305, a menu 1325 may pop up on the touchscreen table 1315 (regardless of what existing menu(s) are open) and show a playlist of different media that can be pulled up on the multifaction monitor array 1310. For instance, in FIG. 13, there may be a "Drone Tech" video option that, when selected, will pull up a video in the view 1330 of the multifaction monitor array that demonstrates the overhead flight path of the drone or other manned or unmanned aerial vehicle that mapped the exterior mesh of the property.

Example Hardware Configuration of Computing System

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, IOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 14:
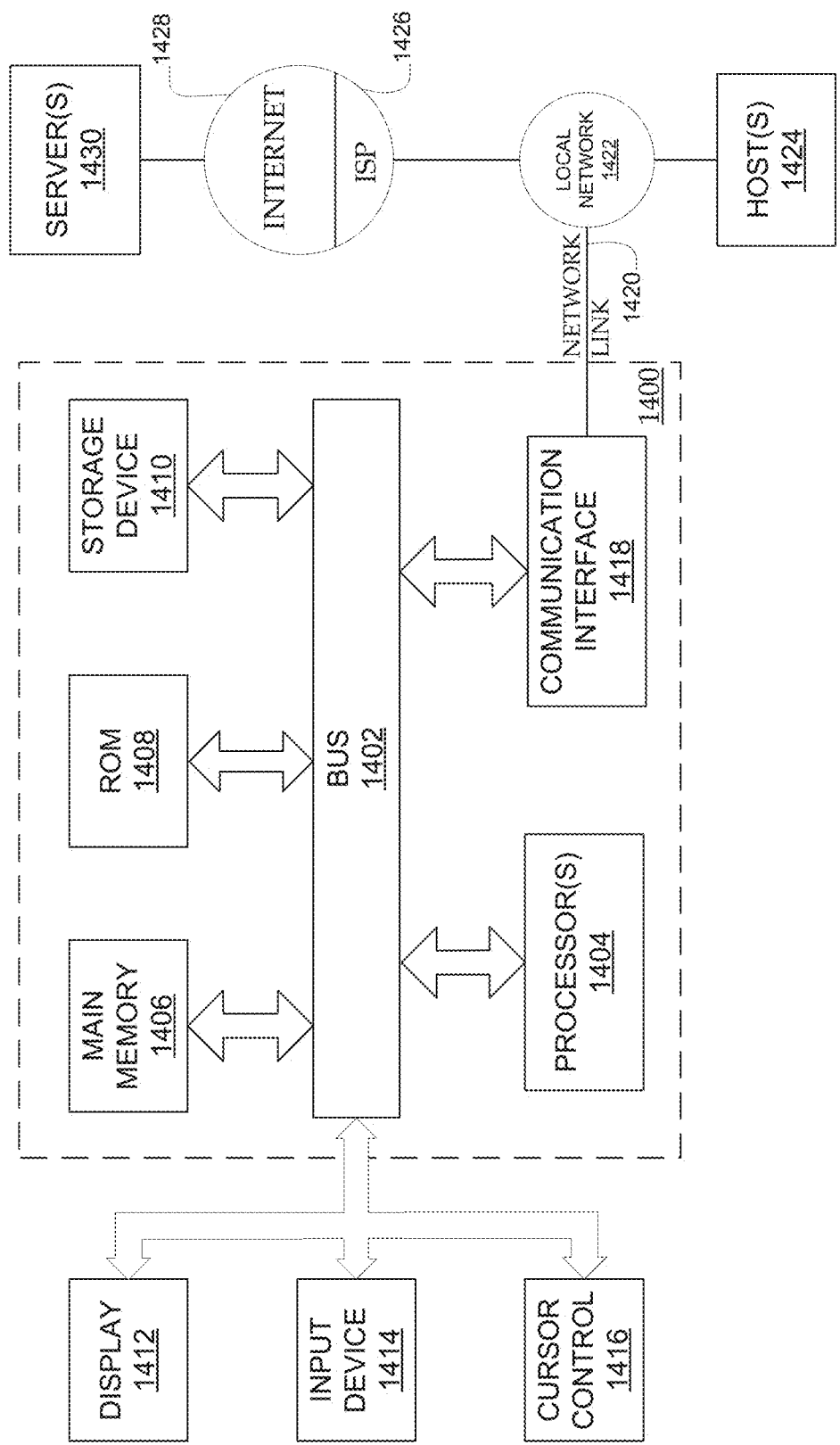
FIG. 14 illustrates an embodiment of a hardware configuration for a computing system usable to implement embodiments of the model generation and display system described herein.

For example, FIG. 14 is a block diagram that illustrates a computer system 1400 upon which various embodiments may be implemented. Computer system 1400 includes a bus 1402 or other communication mechanism for communicating information, and a hardware processor, or multiple processors, 1404 coupled with bus 1402 for processing information. Hardware processor(s) 1404 may be, for example, one or more general purpose microprocessors.

Computer system 1400 also includes a main memory 1406, such as a random access memory (RAM), cache and/or other dynamic storage devices, coupled to bus 1402 for storing information and instructions to be executed by processor 1404. Main memory 1406 also may be used for storing temporary variables or other intermediate information during execution of instructions to be executed by processor 1404. Such instructions, when stored in storage media accessible to processor 1404, render computer system 1400 into a special-purpose machine that is customized to perform the operations specified in the instructions.

Computer system 1400 further includes a read only memory (ROM) 1408 or other static storage device coupled to bus 1402 for storing static information and instructions for processor 1404. A storage device 1410, such as a magnetic disk, optical disk, or USB thumb drive (Flash drive), etc., is provided and coupled to bus 1402 for storing information and instructions.

Computer system 1400 may be coupled via bus 1402 to a display 1412, such as a cathode ray tube (CRT) or LCD display (or touch screen), for displaying information to a computer user. An input device 1414, including alphanumeric and other keys, is coupled to bus 1402 for communicating information and command selections to processor 1404. Another type of user input device is cursor control 1416, such as a mouse, a trackball, or cursor direction keys for communicating direction information and command selections to processor 1404 and for controlling cursor movement on display 1412. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 1400 may include a user interface module to implement a GUI that may be stored in a mass storage device as computer executable program instructions that are executed by the computing device(s). Computer system 1400 may further, as described below, implement the techniques described herein using customized hard-wired logic, one or more ASICs or FPGAs, firmware and/or program logic which in combination with the computer system causes or programs computer system 1400 to be a special-purpose machine. According to one embodiment, the techniques herein are performed by computer system 1400 in response to processor(s) 1404 executing one or more sequences of one or more computer readable program instructions contained in main memory 1406. Such instructions may be read into main memory 1406 from another storage medium, such as storage device 1410. Execution of the sequences of instructions contained in main memory 1406 causes processor(s) 1404 to perform the process steps described herein. In alternative embodiments, hard-wired circuitry may be used in place of or in combination with software instructions.

Various forms of computer readable storage media may be involved in carrying one or more sequences of one or more computer readable program instructions to processor 1404 for execution. For example, the instructions may initially be carried on a magnetic disk or solid state drive of a remote computer. The remote computer can load the instructions into its dynamic memory and send the instructions over a telephone line using a modem. A modem local to computer system 1400 can receive the data on the telephone line and use an infra-red transmitter to convert the data to an infra-red signal. An infra-red detector can receive the data carried in the infra-red signal and appropriate circuitry can place the data on bus 1402. Bus 1402 carries the data to main memory 1406, from which processor 1404 retrieves and executes the instructions. The instructions received by main memory 1406 may optionally be stored on storage device 1410 either before or after execution by processor 1404.

Computer system 1400 also includes a communication interface 1418 coupled to bus 1402. Communication interface 1418 provides a two-way data communication coupling to a network link 1420 that is connected to a local network 1422. For example, communication interface 1418 may be an integrated services digital network (ISDN) card, cable modem, satellite modem, or a modem to provide a data communication connection to a corresponding type of telephone line. As another example, communication interface 1418 may be a local area network (LAN) card to provide a data communication connection to a compatible LAN (or WAN component to communicated with a WAN). Wireless links may also be implemented. In any such implementation, communication interface 1418 sends and receives electrical, electromagnetic or optical signals that carry digital data streams representing various types of information.

Network link 1420 typically provides data communication through one or more networks to other data devices. For example, network link 1420 may provide a connection through local network 1422 to a host computer 1424 or to data equipment operated by an Internet Service Provider (ISP) 1426. ISP 1426 in turn provides data communication services through the world wide packet data communication network now commonly referred to as the "Internet" 1428. Local network 1422 and Internet 1428 both use electrical, electromagnetic or optical signals that carry digital data streams. The signals through the various networks and the signals on network link 1420 and through communication interface 1418, which carry the digital data to and from computer system 1400, are example forms of transmission media.

Computer system 1400 can send messages and receive data, including program code, through the network(s), network link 1420 and communication interface 1418. In the Internet example, a server 1430 might transmit a requested code for an application program through Internet 1428, ISP 1426, local network 1422 and communication interface 1418.

The received code may be executed by processor 1404 as it is received, and/or stored in storage device 1410, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer-implemented method comprising:
   as implemented by a model generation and display system comprising one or more hardware processors,
   generating an exterior point cloud based on an exterior of a building, wherein the exterior point cloud comprises location and depth information for an exterior plurality of points;
   generating an interior point cloud based on an interior of the building, wherein the interior point cloud comprises location and depth information for a plurality of interior points;

orienting the exterior point cloud relative to the interior point cloud by referencing the location and depth information for the exterior plurality of points and the location and depth information for the interior plurality of points;

generating a combined point cloud from the oriented exterior point cloud and the interior point cloud;

rendering a three-dimensional (3D) model of the building from the combined point cloud;

generating first metadata that associates an image of the interior of the building with a portion of the 3D model, wherein the portion of the 3D model corresponds with a geographic location identified in second metadata of the image;

classifying, using machine learning, the location within the 3D model as being a first type of room; and causing a monitor array to display the 3D model, wherein user input received via a sensor embedded in a table separate from the monitor array that detects movement controls a view of the 3D model displayed by the monitor array.

2. The computer-implemented method of claim 1, wherein the image includes one of a captured image of the exterior of the building or a captured image of the interior of the building.

3. The computer-implemented method of claim 2, wherein a view of the 3D model comprises the captured image overlaid on a portion of the 3D model.

4. The computer-implemented method of claim 3, wherein the view of the 3D model shows an interior structure of the building and one or more second images of the interior.

5. The computer-implemented method of claim 1, further comprising:
generating display data for a view of the 3D model of the building; and
providing the display data for the view to a display setup, wherein the display setup includes the monitor array and the table.

6. The computer-implemented method of claim 1, wherein generating the exterior plurality of points of the building further comprises:
directing a vehicle to fly around the building;
obtaining dimension data for the exterior of the building using the vehicle;
obtaining location and depth information for the exterior plurality of points using the vehicle; and
capturing second images of the exterior of the building using the vehicle.

7. The computer-implemented method of claim 1, wherein generating the interior plurality of points of the building further comprises:
obtaining location and depth information for the interior plurality of points using a mobile device;
generating dimension data for a portion of the interior of the building based on the obtained location and depth information for the interior plurality of points; and
capturing second images of the interior of the building using the mobile device.

8. The computer-implemented method of claim 7, wherein the second images of the interior of the building are 360 degree images.

9. The computer-implemented method of claim 1, wherein the location information for the exterior plurality of points is associated with global positioning system (GPS) coordinates.

10. The computer-implemented method of claim 1, wherein the location information for the interior plurality of points is associated with global positioning system (GPS) coordinates.

11. The computer-implemented method of claim 1, wherein the table depicts a second view of the 3D model, and wherein the view of the 3D model displayed by the monitor array is different from the second view of the 3D model.

12. Non-transitory computer storage media storing instructions that when executed by a system of one or more computers, cause the one or more computers to perform operations comprising:
generating an exterior point cloud based on an exterior of a building, wherein the exterior point cloud comprises location and depth information for an exterior plurality of points;
generating an interior point cloud based on an interior of the building, wherein the interior point cloud comprises location and depth information for a plurality of interior points;
orienting the interior point cloud relative to the exterior point cloud by referencing the location and depth information for the plurality of interior points and the location and depth information for the exterior plurality of points;
generating a combined point cloud from the oriented interior point cloud and the exterior point cloud;
rendering a three-dimensional (3D) model of the building from the combined point cloud;
generating first metadata that associates an image of the interior of the building with a portion of the 3D model, wherein the portion of the 3D model corresponds with a geographic location identified in second metadata of the image;
classifying, using machine learning, the location within the 3D model as being a first type of room; and
causing a monitor array to display the 3D model, wherein user input received via a sensor embedded in a table separate from the monitor array that detects movement controls a view of the 3D model displayed by the monitor array.

13. The non-transitory computer storage media of claim 12, wherein the instructions further cause the one or more computers to perform operations comprising:
generating display data for a view of the 3D model of the building; and
providing the display data to for the view to a display setup, wherein the display setup includes the monitor array and the table.

14. The non-transitory computer storage media of claim 12, wherein the instructions further cause the one or more computers to perform operations comprising:
directing a vehicle to fly around the building;
obtaining dimension data for the exterior of the building using the vehicle;
obtaining location and depth information for the exterior plurality of points using the vehicle; and
capturing second images of the exterior of the building using the vehicle.

15. The non-transitory computer storage media of claim 12, wherein the instructions further cause the one or more computers to perform operations comprising:
obtaining dimension data for the interior of the building through a mobile device;
obtaining location and depth information for the interior plurality of points using the mobile device; and capturing second images of the interior of the building using the mobile device.

16. A model generation and display system comprising:
computer storage media storing instructions; and
one or more hardware processors configured to execute the instructions, wherein the instructions, when executed, cause the one or more hardware processors to perform operations comprising:
  generating an exterior property representation based on an exterior of a building;
  generating an interior property representation based on an interior of the building;
  orienting the exterior property representation relative to the interior property representation;
  generating a combined property representation from the oriented exterior property representation and the interior property representation;
  rendering a three-dimensional (3D) model of the building from the combined property representation;
  dividing the 3D model into a plurality of locations based in part on structural features identified by machine learning in the combined property representation of the 3D model;
  generating first metadata that associates an image of the interior of the building with a portion of the 3D model, wherein the portion of the 3D model corresponds with a geographic location identified in second metadata of the image;
  classifying, using machine learning, a location of the plurality of locations within the 3D model as being a first part of a building; and
  causing a monitor array to display the 3D model, wherein user input received via a sensor embedded in a table separate from the monitor array that detects movement controls a view of the 3D model displayed by the monitor array.

17. The model generation and display system of claim 16, wherein the instructions, when executed, cause the one or more hardware processors to further perform operations comprising:
  generating display data for a view of the 3D model of the building; and
  providing the display data for the view to a display setup, wherein the display setup includes the monitor array and the table.

18. The model generation and display system of claim 16, wherein the instructions, when executed, cause the one or more hardware processors to further perform operations comprising:
  associating the location with a hotspot,
  wherein the 3D model comprises an icon associated with the location.

19. The model generation and display system of claim 18, wherein the instructions, when executed, cause the one or more hardware processors to further perform operations comprising:
  receiving a user selection of the icon; and
  causing the monitor array to display an image comprising the hotspot and an additional information item associated with the hotspot.

20. The model generation and display system of claim 19, wherein the instructions, when executed, cause the one or more hardware processors to further perform operations comprising causing the monitor array to display at least one of: a location of the image, or a direction of the image.

* * * * *